(12) United States Patent
Fujita et al.

(10) Patent No.: US 7,618,096 B2
(45) Date of Patent: Nov. 17, 2009

(54) SEAT STRUCTURE

(75) Inventors: Etsunori Fujita, Hiroshima (JP); Seiji Kawasaki, Hiroshima (JP); Yasuhide Takata, Hiroshima (JP)

(73) Assignee: Delta Tooling Co., Ltd., Hiroshima-Shi, Hiroshima (JP)

( * ) Notice: Subject to any disclaimer, the term of this patent is extended or adjusted under 35 U.S.C. 154(b) by 102 days.

(21) Appl. No.: 11/382,599

(22) Filed: May 10, 2006

(65) Prior Publication Data

US 2006/0279119 A1 Dec. 14, 2006

(30) Foreign Application Priority Data

Jun. 13, 2005 (JP) ............................. 2005-173047

(51) Int. Cl.
*A47C 7/02* (2006.01)
(52) U.S. Cl. ................................ 297/452.56
(58) Field of Classification Search ............ 297/284.2, 297/284.11, 216.13, 216.14, 216.15, 216.16, 297/452.56, 207, 205, 452.64, 452.63, 217.1
See application file for complete search history.

(56) References Cited

U.S. PATENT DOCUMENTS

| | | | | |
|---|---|---|---|---|
| 607,283 | A * | 7/1898 | Schaffner | 297/205 |
| 3,273,877 | A * | 9/1966 | Geller et al. | 267/89 |
| 4,615,563 | A * | 10/1986 | Kobayashi | 297/284.6 |
| 4,915,447 | A * | 4/1990 | Shovar | 297/284.11 |
| 5,601,338 | A * | 2/1997 | Wahls | 297/313 |
| 5,772,281 | A * | 6/1998 | Massara | 297/284.4 |
| 6,419,317 | B1 * | 7/2002 | Westrich et al. | 297/284.11 |
| 6,460,819 | B1 * | 10/2002 | Muhlberger et al. | 248/421 |
| 6,604,792 | B1 * | 8/2003 | Picard | 297/452.56 |
| 6,644,752 | B2 * | 11/2003 | Takata | 297/452.56 |
| 6,851,755 | B2 * | 2/2005 | Dinkel et al. | 297/452.48 |
| 6,854,805 | B2 * | 2/2005 | Fujita et al. | 297/452.56 |
| 2002/0113473 | A1 * | 8/2002 | Knaus | 297/284.11 |
| 2003/0116999 | A1 | 6/2003 | Fujita et al. | |
| 2004/0178667 | A1 | 9/2004 | Fujita et al. | |
| 2004/0239514 | A1 | 12/2004 | Takata | |

FOREIGN PATENT DOCUMENTS

| | | |
|---|---|---|
| JP | 2003-182427 | 7/2003 |
| JP | 2004-141545 | 5/2004 |
| JP | 2004-188164 | 7/2004 |
| JP | 2004-347577 | 12/2004 |
| WO | 2004/007238 A1 | 1/2004 |

* cited by examiner

*Primary Examiner*—Milton Nelson, Jr.
(74) *Attorney, Agent, or Firm*—Cozen O'Connor

(57) ABSTRACT

In order to improve seating comfort and vibration absorbency, the present invention includes a front torsion bar unit 80 disposed in the front of a seat cushion, the front end of a base net 60 is connected to a supporting frame 84 of the front torsion bar unit 80, the rear end of the base net 60 is connected to a rear frame 70. Accordingly, owing to elastic force of a front torsion bar 81 of the front torsion bar unit 80 positioned in the front of the seat cushion, a sense of stroke at the time of seating is enhanced. A structure to dispose a torsion bar unit in the front as in the present invention works upon a tiny load fluctuation sensitively, and absorbency of high frequency vibration is further enhanced.

10 Claims, 28 Drawing Sheets

F I G. 2
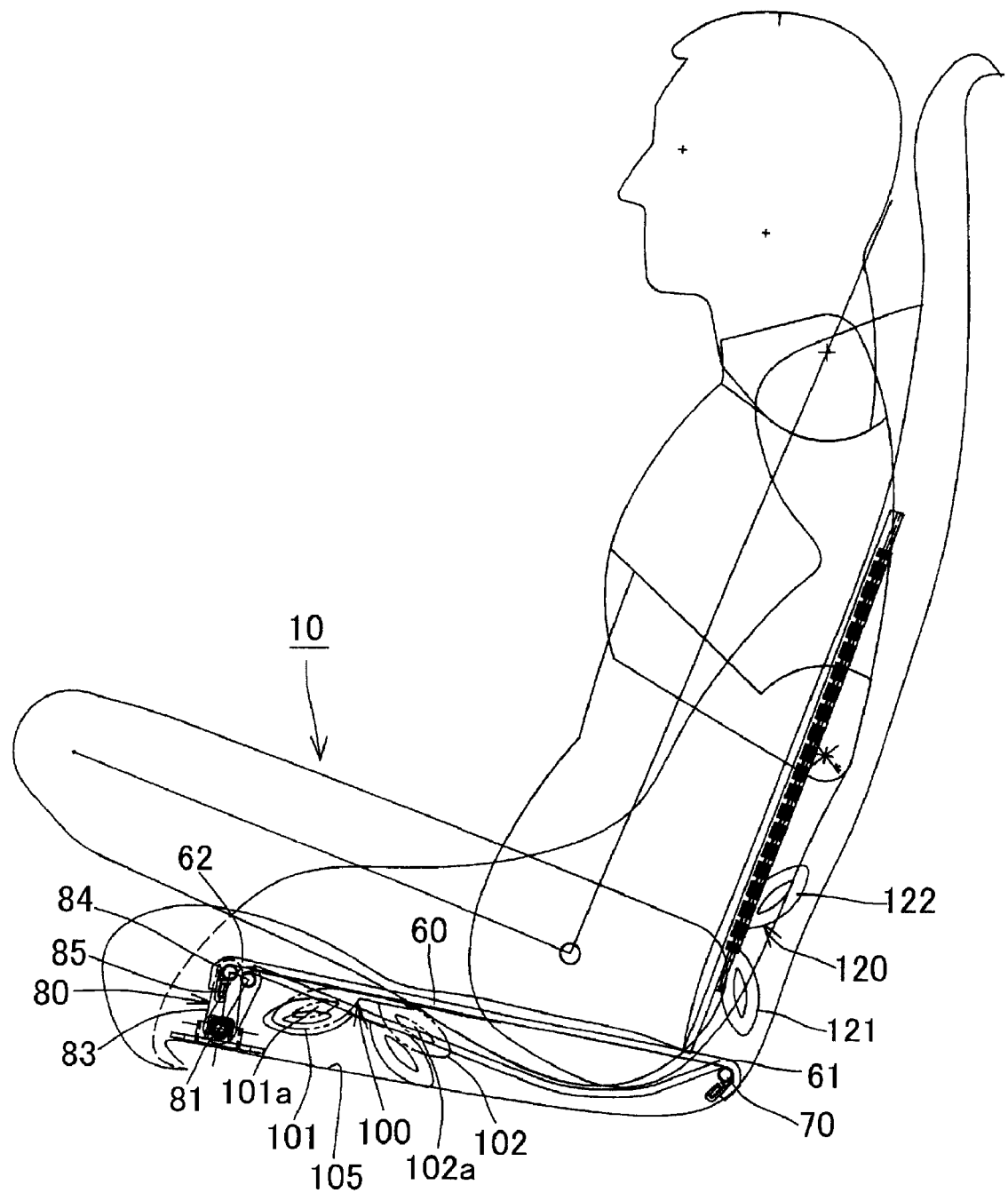

F I G. 1 0
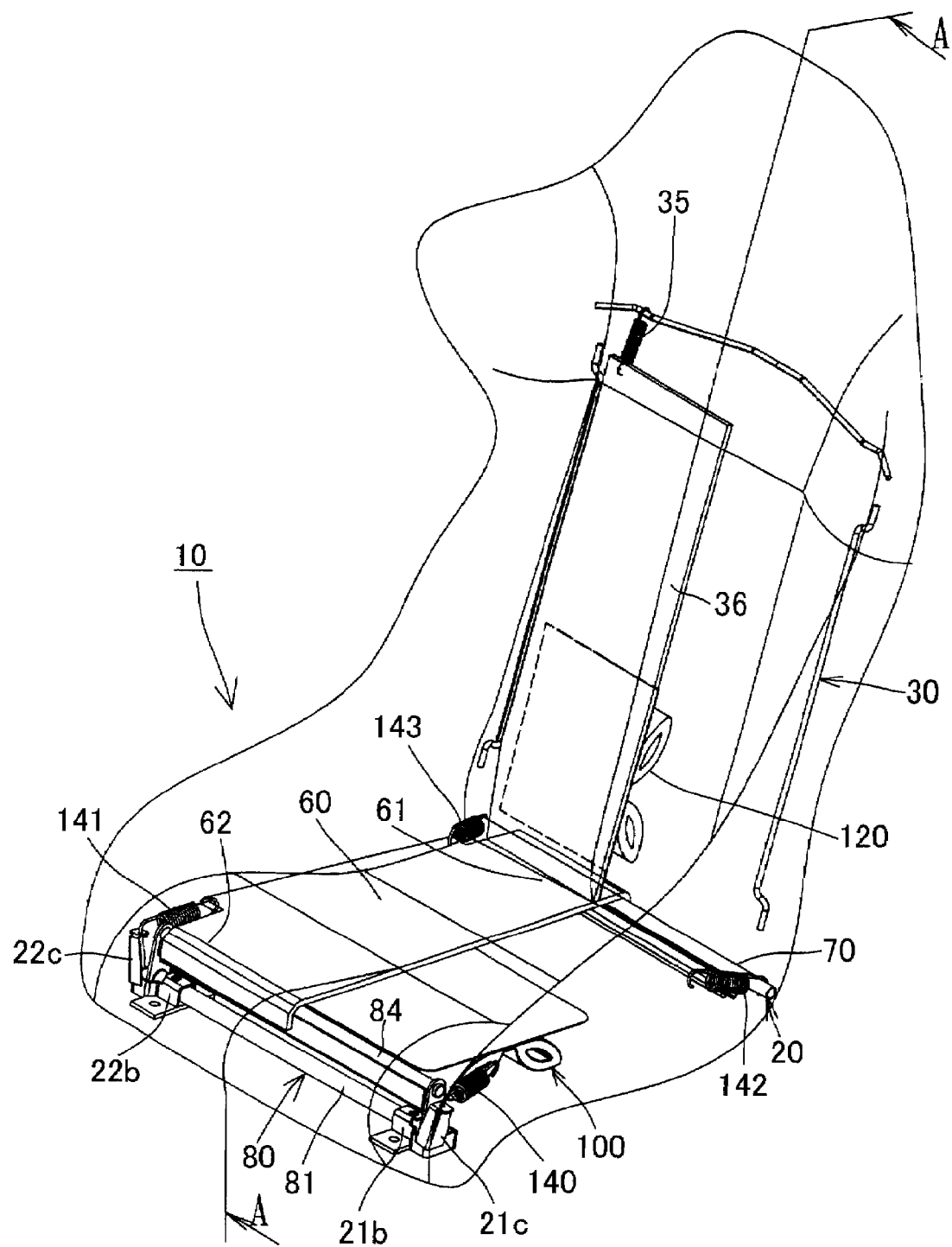

SEAT STRUCTURE

BACKGROUND OF THE INVENTION

1. Field of the Invention

The present invention relates to a seat structure, in particular relates to seats suitable for a transportation machine such as a plane, a train, a ship, a forklift, a motor vehicle and so on.

2. Description of the Related Art

A seat structure formed by stretching a cushioning member such as a solid knitted fabric (a three-dimensional net member) across a seat frame is disclosed in Patent Documents 1 to 5. When forming a cushioning member stretching across a seat frame in this manner, in order to enhance preventability of bottom-touch, vibration absorbency, impact absorbency, a base net made of cloth such as a solid knitted fabric, a two-dimensional cloth and the like is provided below the above-described cushioning member via an elastic member. In all of the Patent Documents 1 to 5, a torsion bar unit including a torsion bar, an arm biased in the falling rearward direction, and a supporting frame supported by the arm, is disposed in the rear of a seat cushion, and the base net is elastically supported by connecting the rear end of the base net to the supporting frame. Note that the front end of the base net is fixed to a front frame composing the seat frame.

[Patent Document 1] Japanese Patent Application Laid-open 2004-347577

[Patent Document 2] Japanese Patent Application Laid-open 2003-182427

[Patent Document 3] Japanese Patent Application Laid-open 2004-188164

[Patent Document 4] Japanese Patent Application Laid-open 2004-141545

[Patent Document 5] International Patent Publication WO 2004/007238A1

In the technology disclosed in Patent Documents 1 to 5, by elastically supporting a base net with a torsion bar, it is possible to achieve improvement of vibration absorbency as described above without bringing a feeling of something foreign to users despite a fact that by using thinner material compared with urethane material generally used in a prior art as a cushioning member for a car seat or the like, a hip point (H. P.) is lowered by about 10 mm compared with using the urethane. However, in all the technology described above, a torsion bar is disposed in the rear of the seat cushion, and the front end of the base net is fixed. In particular, a structure disposing arms and a supporting frame connected to a torsion bar on a rearward and upward-tilting side is excellent in vibration absorbency, but gives a feeling of the buttocks or the pelvis being pushed from behind when seating due to pulling the rear end of the base net in a rearward and upward-tilting direction, or gives a sense of so-called seating on a hammock. Then, the sense of seating on a hammock is eliminated by taking a countermeasure such as lying urethane material under the buttocks, the urethane material having a thickness of about 20 mm and being enhanced in facial rigidity by impregnating felt into the urethane. Disposition of another urethane material in the front of the seat cushion is carried out in order to reduce a feeling of something foreign of a frame (front frame) disposed in the front of the seat cushion to fix the front end of the base net, but since a material having a sense of relatively hard springiness is used as the urethane material, it sometimes lacks a sense of stroke, and on receiving force from the leg during pedal operation, the counter force is sometimes perceived as a sense of hitting the front end of the seat cushion.

In a structure disposing arms and a supporting frame connected to the torsion bar on the rear tilting-upward side, since a point of load while stably seated is under the ischium node, namely, close to the torsion bar unit disposed in the rear, a component force in the direction of gravity works on the torsion bar, which makes the torsion bar hard to move, and a component force in the horizontal direction to move the arms and the supporting frame in front and behind is hard to work. Therefore, it is possible to further enhance the vibration absorbency if such points are improved.

When a rearward moment equal to or more than the pre-determined value is applied on the seat back, the seat cushion is elastically deformed downward from the rear side portion from near the center of side frames of the seat cushion. Accordingly, a supporting frame of a torsion bar unit provided in the rear of the seat cushion so that the torsion bar is positioned at the top with the arms protruding downward from the torsion bar, displaces as if being pushed out forward accompanying this deformation and works to loosen the base net. Accordingly, when the base net is disposed in this manner, it is impossible to sufficiently execute a function to control frame deformation of the seat back by the base net.

Since the structure disposing the torsion bar unit in the rear places the configuration in the vicinity of the rear portion of the seat cushion, and requires a large space to dispose the torsion bar unit, it has a problem in that the leg room available behind the front seat is often constricted.

SUMMARY OF THE INVENTION

The present invention is achieved in consideration of the above problems, and an object of the present invention is to provide a seat structure which, is not only able to enhance a sense of stroke when seating, but also can further improve vibration absorbency while maintaining a hip point about 10 mm lower than that of a conventional seat structure so as to further improve a feeling of sitting, seating comfort, and riding comfort, without increasing the complexity of the structure, or the number of parts, and can widen the leg room available in the rear seat.

In order to solve the above problems, the present invention provides a seat structure having a cushioning member for a seat cushion disposed by stretching across seat frames, and a base net disposed under the cushioning member for the seat cushion, including:

a front torsion bar unit including a torsion bar, arms connecting to the torsion bar, and a supporting frame supported by the arms, and the arms being provided at the front of the seat cushion pivotably in front and behind around the torsion bar acting as a fulcrum, in which a front end of the base net is engaged with a supporting frame of the front torsion bar unit being wound around from above, and a rear end of the base net is engaged with the rear frame disposed in the rear of the seat cushion along the width direction of the seat cushion.

The invention provides a seat structure in which the front torsion bar unit is provided so that the torsion bar acting as a fulcrum is positioned lower than the supporting frame supported via the arms.

The invention provides a seat structure in which an engaging bracket protruding downward is attached to the supporting frame of the front torsion bar unit, the front end of the base net is passed through above the supporting frame and stretched around the supporting frame, and a portion to be engaged provided at the front end is engaged with the engaging bracket.

The invention provides a seat structure in which the pivoting range of the arm in the front torsion bar unit is set at an angle of 40° or less respectively in front and behind around the torsion bar with respect to an unloaded state.

The invention provides a seat structure in which the side frame of the seat frame are elastically deformed when a load equal to or greater than a predetermined limit is placed rearwards on the seat back during impact, the rear frame displaces in a rearward-tilting direction, the tension of the base net is increased, so that deformation of the back frame can be controlled.

The invention provides a seat structure, further including an auxiliary elastic mechanism provided under the base net between the front torsion bar unit and the rear frame, to support a load together with the base net.

The invention provides a seat structure in which the auxiliary elastic mechanism is formed including an air cushion disposed under the base net and having a plurality of partitioned bulging portions.

The invention provides a seat structure in which the auxiliary elastic mechanism includes an auxiliary net disposed under the base net, and a coil spring elastically supporting the auxiliary net to the side frames of the seat frame.

The invention provides a seat structure further including an elastic force adjusting spring between the vicinities of the respective sides at the front end of the base net and the portion to be engaged of the front spring positioned in the front of the seat cushion.

The invention provides a seat structure further including an elastic force adjusting spring between the vicinities of the respective sides at the rear end of the base net and the portion to be engaged of the rear spring positioned in the rear of the seat cushion.

BRIEF DESCRIPTION OF THE DRAWINGS

FIG. 2 is a sectional arrow diagram taken from the line A-A in FIG. 1;

FIG. 10 is a view showing a seat structure according to a third embodiment of the present invention;

DETAILED DESCRIPTION OF THE PREFERRED EMBODIMENT(S)

Figure 1:
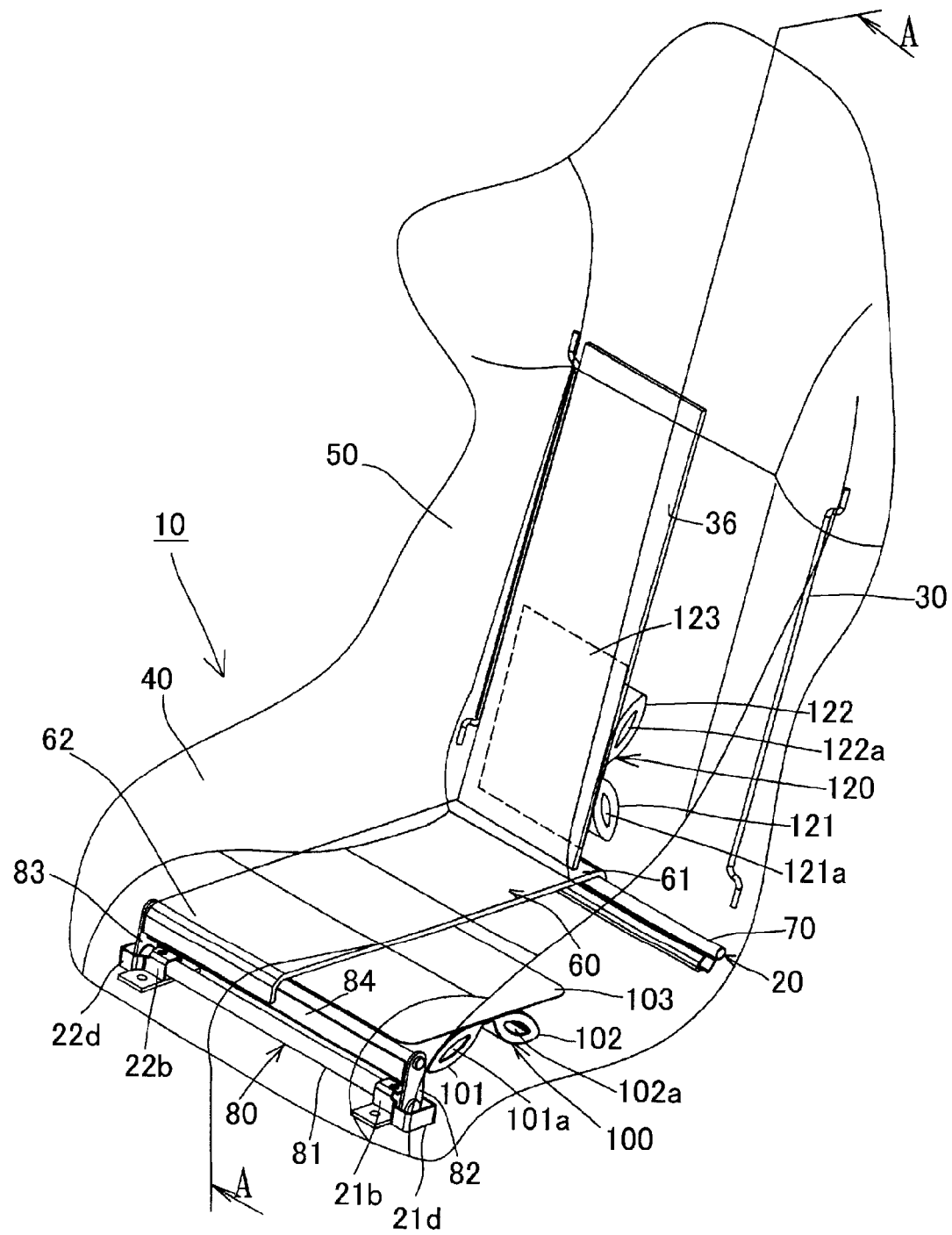
FIG. 1 is a view showing a seat structure according to a first embodiment of the present invention.

Hereinafter, the present invention will be further explained in detail based on embodiments shown in the drawings. FIGS. 1 and 2 are views showing a seat structure 10 according to a first embodiment of the present invention. The seat structure 10 includes a seat frame 20 and a back frame 30. The seat frame 20 includes side frames disposed on both sides at a predetermined distance. A cushioning member for a seat cushion 40 is disposed so as to cover the side frames and the like by stretching across these frames. The back frame 30 includes side frames and the like disposed at a predetermined distance, and a cushioning member for a seat back 50 is disposed so as to cover the side frames and the like by stretching across these side frames.

It is possible to use a structure having a two-dimensional cloth (a knitted fabric, an oven fabric, a net or the like) layered with a thin urethane material as the cushioning member 40 for a seat cushion or the cushioning member 50 for a seat back, but it is preferable to use a solid knitted fabric (a three-dimensional net member). The solid knitted fabric has a high restoration ability and a moderate elasticity though it is thin. Therefore, it exhibits soft spring characteristics when a load is focused on one point, but is high in facial rigidity at a facial contact with a predetermined magnitude and has a characteristic to exhibit hard spring characteristics. For instance, since in load-deflection characteristics using a press board having a diameter of 30 mm which corresponds to a protruding bone of a person, a soft spring characteristic works, and in load-deflection characteristics using a press board having a diameter of 98 mm, a spring characteristic having high facial rigidity and high linearity works. The solid knitted fabric has a spring characteristic having a tendency close to the case of measuring a buttock muscle of a human with press boards 30 mm in diameter and 98 mm in diameter. Accordingly, when the solid knitted fabric is used as a cushioning member for a seat cushion 40 or a cushioning member for a seat back 50, a layer having characteristics close to human muscle is disposed, which makes it possible to effectively disperse an external force without a feeling of something foreign.

The solid knitted fabric is a stereoscopic three-dimensional structure including a pair of ground knitted fabrics disposed apart from each other and a number of connecting yarns connecting both by reciprocating the pair of ground knitted fabrics. One of the ground knitted fabrics is formed with a flat knitted structure (fine mesh) made by, for instance, connecting yarn from twisted monofilaments in either directions of wales and course, and the other ground knitted fabric is formed in a stitch structure having a honeycomb-shaped (hexagon) mesh made of, for instance, yarn from twisted short fibers. It goes without saying that the knitted structure is arbitrary, and a knitted structure other than a fine mesh structure or a honeycomb-shaped structure can be adopted, and the combination is also arbitrary such as adoption of fine mesh structure for both fabrics. The connecting yarn is a yarn knitted between a pair of ground knitted fabrics so as to maintain a predetermined distance between one ground knitted fabric and the other ground knitted fabric, and serves to give a predetermined rigidity to the solid knitted fabric. The thickness of a ground yarn forming the ground knitted fabric is selected from a range able to provide necessary waist strength to the solid knitted fabric without causing any difficulty of assembly.

As a material for ground yarn or connecting yarn, a synthetic fiber or a regenerated fiber such as polypropylene, polyester, polyamide, polyacrylonitrile, rayon, etc., and a natural fiber such as wool, silk, cotton can be cited. These materials can be used alone, or can be used in combination arbitrarily. Preferably, thermoplastic polyester resins such as polyethylene terephthalate (PET), polybutylene terephthalate (PBT) and the like, polyamide resins such as nylon 6, nylon 66, and the like, polyolefin resins such as polyethylene, polypropylene, and the like, polytrimethylene terephthalate (PTT) or a resin obtained by combining two kind or more of these resins can be used. Furthermore, polyester series resin is suitable due to excellent recycling ability The shape of the ground yarn or the connecting yarn is not limited and circular section yarn, modified cross-section yarn or the like can be adopted.

The connecting yarn may form a loop-shaped stitch in the ground knitted fabrics existing in a front layer and a back layer, or a structure to be stretched over the ground knitted fabric on the front layer and back layer by an insertion system may be also adopted, but connection of the front layer and the back layer of the knitted fabric with at least two connecting yarns in a cross (X-shape) or in a truss by obliquely inclining in reverse directions to each other is preferable to improve a shape stability of the solid knitted fabric.

Note that the solid knitted fabric can be knitted by a knitting machine having two opposing rows of needle beds. As such a knitting machine, a double Raschel knitting machine, double circular knitting machine, weft knitting machine with a V bed, and so on can be cited. In order to obtain a solid knitted fabric excellent in size stability, it is preferable to use a double Raschel knitting machine.

A base net 60 is disposed under the cushioning member 40 for a seat cushion. The base net 60 is elastically stretched on the seat frame 20 to perform a function to improve a sense of stroke during seating, a function to prevent bottom touch, or a function to absorb vibration. Also in the present embodiment, the facial rigidity in the vicinity of a supporting frame 84 is increased due to supporting the front end of the base net 60 by a front torsion bar unit 80 (will be described later). Therefore, the present embodiment has a function to cope with a feeling of something foreign at the front end, and a function to control large deformation of the seat back. Material to form the base net 60 is not limited, two-dimensional cloth (knitted fabric, woven fabric, net form, or the like) can be used or the above-described solid knitted fabric (three-dimensional net member) can be also used.

The base net 60 is disposed in the rear of the seat cushion and supported by a rear frame 70 forming a portion of the seat frame 20 and a front torsion bar unit 80 disposed in the front of the seat cushion. Note that the front torsion bar unit 80 also composes a portion of the seat frame 20. It should be noted that the rear of the seat cushion refers to the vicinity of the rear end of the side frames composing the seat frame 20, or the vicinity of the lower end of the side frame composing the back frame 30, and the front portion of the seat cushion refers to the vicinity of the front end of the side frames composing the seat frame 20. According to the present embodiment, for a member to support the base net 60, it is sufficient to dispose only one pipe-shaped or a plate-shaped rear frame 70 in the rear of the seat cushion, so that a large space for the leg room available for a person seated on the rear seat can be assured compared with the conventional structure of disposing a torsion bar unit in the rear, and rearward expansion of the seat size can be restrained.

In the conventional structure of disposing a torsion bar unit in the rear of the seat cushion, it sometimes happens that movement of the torsion bar becomes worse because a load is come to be applied always on the torsion bar unit by trim treatment for finishing the external appearance, and force working in a direction orthogonal to the center of rotation of the torsion bar (a component force in the horizontal direction in this embodiment) is reduced so that vibration absorbency is impaired. However, as in the present embodiment, when the front torsion bar unit 80 is provided at the front portion of the seat cushion, legs move often due to pedal operation or whole-body vibration, and a load cannot always apply to the front torsion bar unit 80. Force working in a direction orthogonal to the center of rotation of the torsion bar 81 (a component force in the horizontal direction in this embodiment) is strong. Accordingly, the front torsion bar unit 80 of the present embodiment is easy to move and does not impair vibration absorbency.

The front torsion bar unit 80 includes a torsion bar 81 supported by attachment metal fittings 21*b* and 22*b* fixedly provided to an arbitrary portion in the vicinity of the front end of the side frames of the seat frame 20 on both ends of the torsion bar 81, arms 82 and 83 connected to both ends of the torsion bar 81 respectively, and a supporting frame 84 stretched between two arms 82 and 83, and provided along the width direction of the seat cushion, similarly to the above-described front torsion bar 81. In the present embodiment, the arms 82 and 83 are provided so as to protrude above the torsion bar 81 acting as a fulcrum, pivot in front and behind around the torsion bar 81 as a fulcrum, and when twisted due to pivoting, they tend to return to an initial position by the elastic force of the torsion bar 81. Stoppers to control the pivoting range of the arms 82 and 83 in front and behind the arms 82 and 83. In the present embodiment, the arms 82 and 83 are surrounded by annular type frames 21*d* and 22*d* in FIG. 1. The portions positioned on the rearward-tilting side of the arms 82 and 83 out of the annular type frames 21*d* and 22*d* work as stoppers to control the pivoting range of rearward-tilting, and portions positioned on the forward-tilting side of the arms 82 and 83 work as stoppers to control the pivoting range of forward-tilting. The pivoting range of the arms 82 and 83 to abut on the stoppers is preferably set in the range of 40° at maximum around the torsion bar 81 in both forward-tilting and rearward-tilting direction respectively, and more preferably in the range of 25° to 35°. Through this setting, it is possible to restrain deformation of the back frame by abutting on the stoppers when a load greater than a predetermined limit is applied to function the tension of the base net 60.

Figure 5:
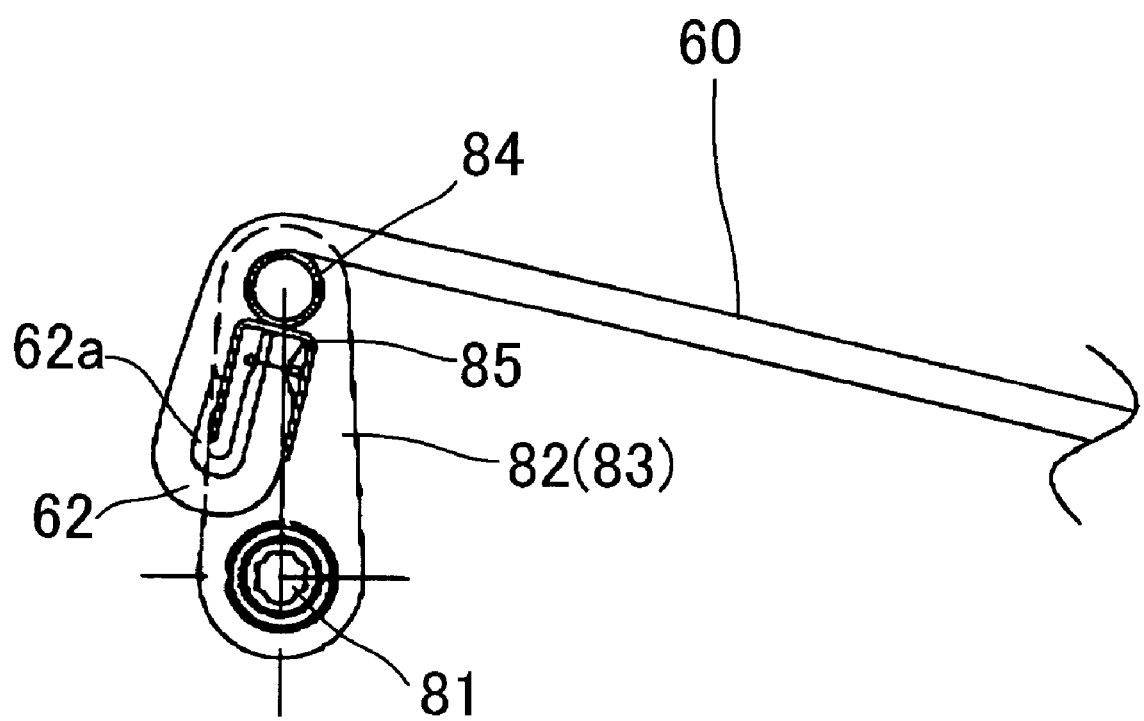
FIG. 5 is a view explaining a method of engaging the base net in the above-described embodiment.

The rear end 61 of the base net 60 is connected to the rear frame 70, and the front end 62 is wound around the supporting frame 84 of the front torsion bar unit 80 from above and connected thereto so as to function the elastic force of the torsion bar 81. Concretely, as shown in FIGS. 2 and 5, the engaging bracket 85 protruding downward is provided to the supporting frame 84. The front end 62 of the base net 60 is drawn forward after passing through above the supporting frame 84, and a portion 62a to be engaged composed of a substantially U-shaped plate member provided at the front end is engaged with the engaging bracket 85, so that the front end 62 of the base net 60 is fixed so as to be wound around the supporting frame 84 from above. By configuring as above, when a load is applied to the base net 60 from above, the base net 60 displaces so as to wind around the supporting frame 84 of the front torsion bar unit 80.

Figure 3:
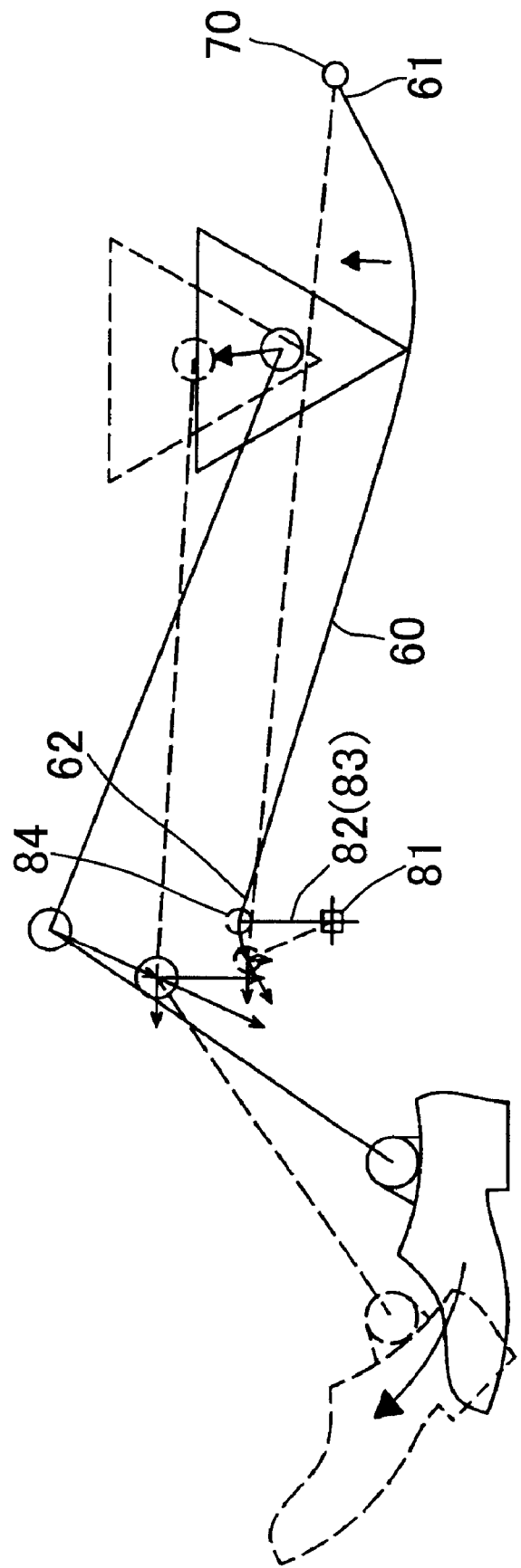
FIG. 3 is a diagram to explain the functioning of the seat structure during pedal operation according to the above-described embodiment.

When a person takes a seat, the point on which the body weight is applied between the front torsion bar unit 80 and the rear frame 70 is on the rear frame 70 side which is the end to be fixed of the base net 60, and a load is applied to the base net 60 from above. Therefore, the vicinity of the rear end of the base net 60 positioned under the ischium node is depressed greatly, and the base net 60 deforms downward in the vicinity at the rear end. Whereas, in the front torsion bar unit 80, the torsion bar 81 which acts as a fulcrum of the pivoting movement is provided at a position lower than the supporting frame 84, attached to the engaging bracket 85 of the supporting frame 84 in a manner as described above. Moreover, since the point on which body weight acts is on the rear frame 70 side, which is far from the supporting frame 84, the base net 60 displaces so as to wind around the supporting frame 84, and the horizontal component of the load acts greatly. Therefore, during load fluctuation, the torsion bar 81 and the arms 82 and 83 (support frame 84) displace more sensitively than expansion of the base net 60. Accordingly, as shown in FIG. 3, during pedal operation, since the buttocks is raised by the extension of the knee, the base net 60 displaces upwards following the buttocks, and the arms 82 and 83 of the front torsion bar unit 80 can easily pivot in nearly the same direction as the movement of the knee.

Figure 7A:
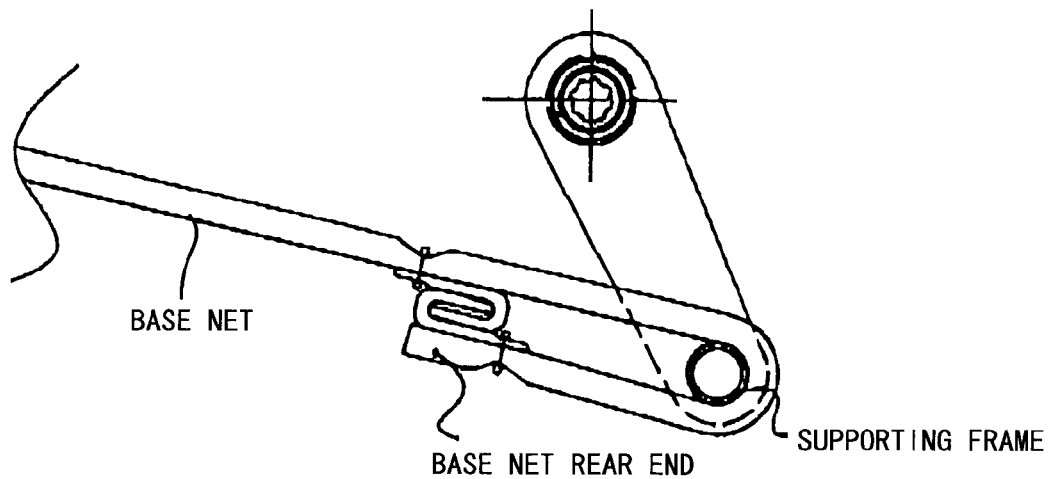
FIGS. 7A and 7B are views showing an engaging method of a conventional base net.
Figure 7B:
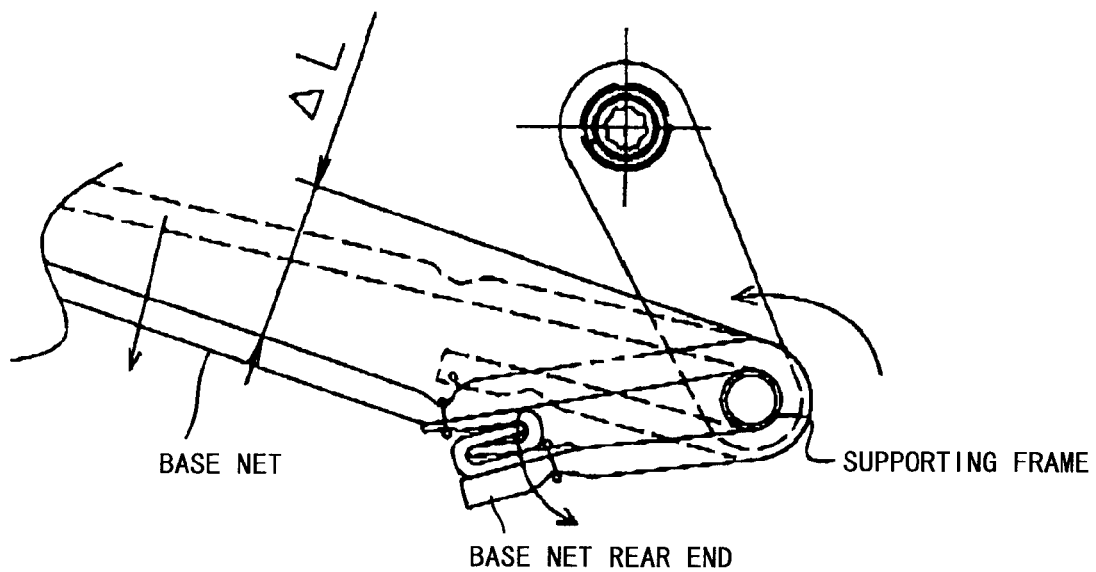

In the supporting frame of the torsion bar unit disposed in the above-cited Patent Documents 1 to 5, as shown for reference in FIGS. 7A and 7B, after the rear end of the base net is wound around the supporting frame from above or from under the supporting frame, the rear end is drawn toward the front end of the base net, and both portions are overlapped at a position toward the front end side from the rear end. In other words, the vicinity of the base net rear end is connected so as to form a cylinder in a state of the supporting frame being inserted. Therefore, when a load is applied, the base net connected to the supporting frame in a cylindrical shape rotates along the peripheral surface of the supporting frame, creating friction. As a result, when a connection structure between the base net and the supporting frame is made similarly to a conventional structure, a part of the load is received by this friction, which cancels a force to rotate the supporting frame 84 and the arms 82, 83 around the torsion bar 81, which results in lowering the sensitivity.

Figure 6A:
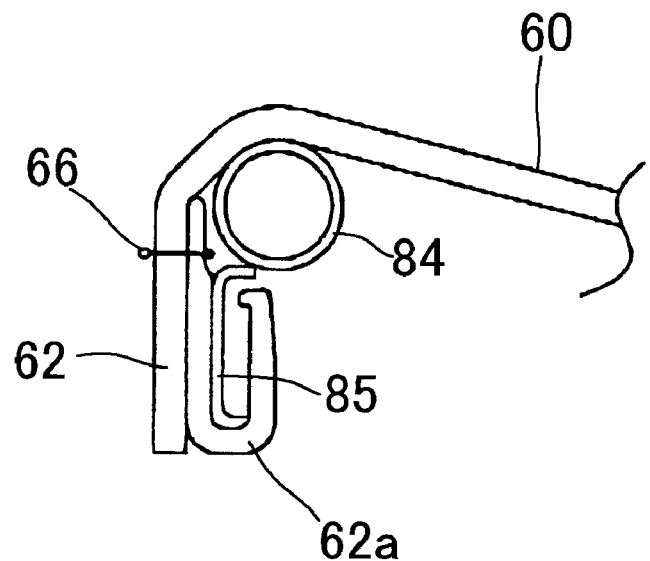
FIGS. 6A and 6B are views showing preferable examples of the engaging method of the base net.
Figure 6B:
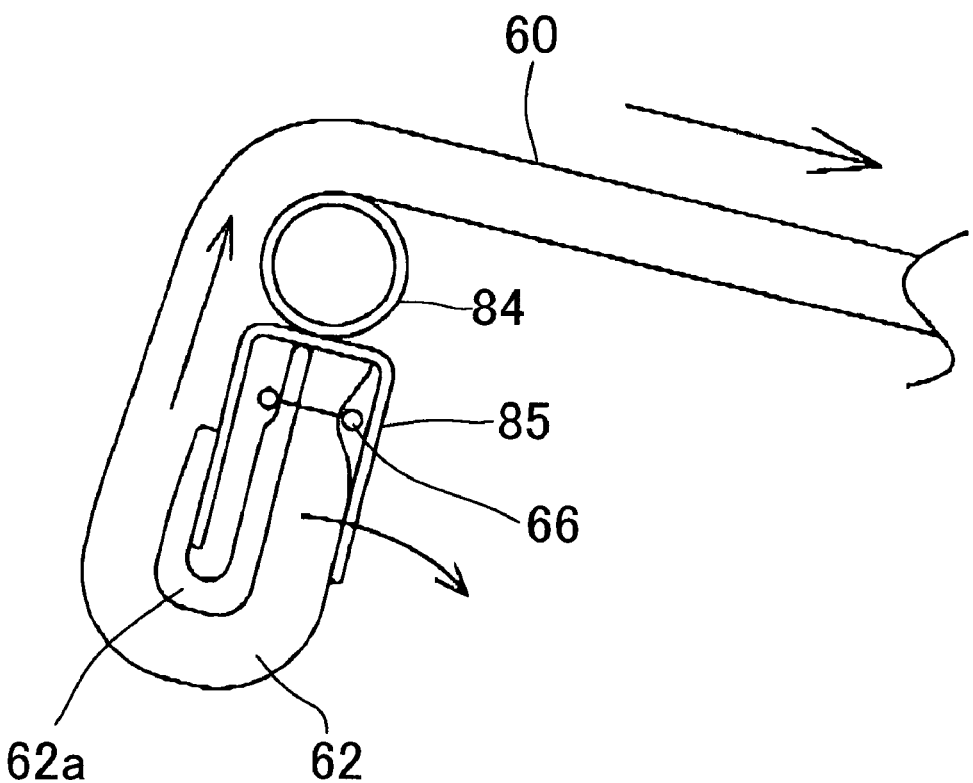

In FIG. 2, merely a plate-like article is used as the engaging bracket 85 as shown in details in FIG. 6A. Whereas, in FIG. 5, a substantially U-shaped engaging bracket 85 is attached as shown in details in FIG. 6B. It is possible to use both as the engaging bracket 85. In a case of a plate as shown in FIG. 6A, since the front end 62 is only connected to the portion 62a to be engaged made of a substantially U-shaped plate member with sewing thread 66, a load applied to the base net 60 is supported by the strength of the portion 62a to be engaged and the sewing thread 66. Accordingly, when a solid knitted fabric or the like is used as the base net 60, a position to connect with the sewing thread 66 is displaced due to the load, unexpected elongation of the base net occurs, and durability problems also arise. Therefore, as shown in FIG. 6B, using the engaging bracket 85 in a substantially U shape, it is preferable to structure the end of the base net such that the portion 62a to be engaged connected to the front end 62 by the sewing thread 66 is inserted into the inside of the substantially U-shaped engaging bracket 85. By taking this structure, when a load is applied, a portion inserted into the substantially U-shaped engaging bracket 85 displaces in the direction of rotation, and friction is produced between the inner surface of the portion 62a to be engaged and one wall portion of the substantially U-shaped engaging bracket 85, and between the outer surface near the upper end of a portion to be inserted and the other wall portion of the substantially U-shaped engaging bracket 85. Therefore, since the load applied to the base net 60 is converted into the change of shape owing to displacement of the portion inserted in the substantially U-shaped engaging bracket 85 in the direction of rotation, and the above-described friction, the force applied to the connecting portion to the sewing thread 66 can be cancelled and unnecessary elongation of the base net 60 can be suppressed.

An auxiliary elastic mechanism to support the load together with the base net 60 is provided under the base net 60. The auxiliary elastic mechanism of the present embodiment includes an air cushion 100. The air cushion 100 includes a plurality (two in the present embodiment) of partitioned bulging portions 101 and 102, and a flexible plate 103 integrally fixed at a border portion of these bulging portions 101 and 102, the flexible plate 103 is fixed in the rear surface of the base net 60, and provided at a position corresponding to the vicinity from near the center to the front of the base net 60. The bulging portions 101 and 102 are formed in a nearly cylindrical shape with a processed solid knitted fabric, and air bags 101a and 102a having air inlets are arranged inside the bulging portions. A pump (not shown) is connected to the air inlets provided in the air bags 101a and 102a, so that the amount of air to be injected can be adjusted. Moreover, under the bulging portions 101 and 102, an auxiliary plate 105 fixed to the seat frame 20 is provided so that the bulging portions 101, 102 abut and exhibit prescribed elastic force when the base net 60 moves downward.

Through this structure, functions to firmly support a human load and prevent bottom touch are performed, and since the air cushion 100 is disposed a little further forward than a position corresponding to the point under the ischium node when a person is seated, functions to prevent forward displacement of the buttocks and maintain a stable seating posture during seating, are exhibited. It is preferable to set the air cushion 100 not to abut on the auxiliary plate 105 in a case of high frequency vibration with a small displacement. It is thereby possible to suppress transmission of vibration via the auxiliary plate 105. In addition, the air cushion 100 exhibits a function to ease impact force when a great load such as collision is inputted.

According to the present embodiment, when seating, the arms 82, 83 and the supporting frame 84 of the front torsion bar unit 80 moves in a rearward-tilting direction around the torsion bar 81 acting as a fulcrum. In other words, when seating, the arms 82 and 83 effectively stroke, and amount of displacement is large. Accordingly, when seating, a sense of stroke can be directly sensed with mainly back side of the femur and buttocks so that a feeling of sitting on can be enhanced. As described above, it has a structure such that the arms 82 and 83 effectively stroke, the tension of the base net 60 always acts on the torsion bar 81, and the direction of movement of the leg and the direction of pivoting of the arms 82, 83 and the supporting frame 84 of the front torsion bar unit 80 are consistent with each other. Therefore, even when a thin solid knitted fabric or a thin urethane material or the like having a thickness of about 30 mm is used as a cushioning member 40 for a seat cushion, there is no sense of hitting in spite of disposing the supporting frame 84. In other words, owing to the elastic force of the torsion bar 81, the tension of the base net can act, the facial rigidity in the vicinity of the front end 62 of the base net 60 is increased so that a face having high rigidity is created in the vicinity of the front end 62, and at the same time, the direction of movement of the leg and the direction of rotation of the supporting frame 84 are consistent. Therefore, the counter force cannot easily act so that the supporting frame 84 is not sensed as a line. Accordingly, adoption of thick urethane material as auxiliary cushioning member in the vicinity of the front portion of the seat cushion as in the prior art becomes unnecessary.

In a statically seated state after the seating movement has finished, when the leg is moved forward for operating a pedal, if the leg is taken as a link structure, as shown in FIG. 3, the pelvis is apt to move upward. Accordingly, the supporting frame 84 composed of pipes displaces so as to pivot forward. Since the direction of displacement of the supporting frame 84 is almost consistent with the direction of movement of the knee, the elastic force of the torsion bar 81 can effectively act, the counter force is cancelled, a sense of hitting on the legs is sensed minor. In a seated state, the heaviest load is applied to the vicinity under the ischium node. However, since the elastic force of the base net 60 itself acts as described above, and the restoration force of the torsion bar 81 swiftly works, the vibration absorbency is excellent, and a sense of bottom touch is not as apparent. Moreover, body weight can be firmly supported with the above-described highly rigid surface. At this time, the elastic force of the air cushion 100 works in a supplemental manner to prevent the buttocks from displacing forward and maintain a stably seated posture.

Figure 4:
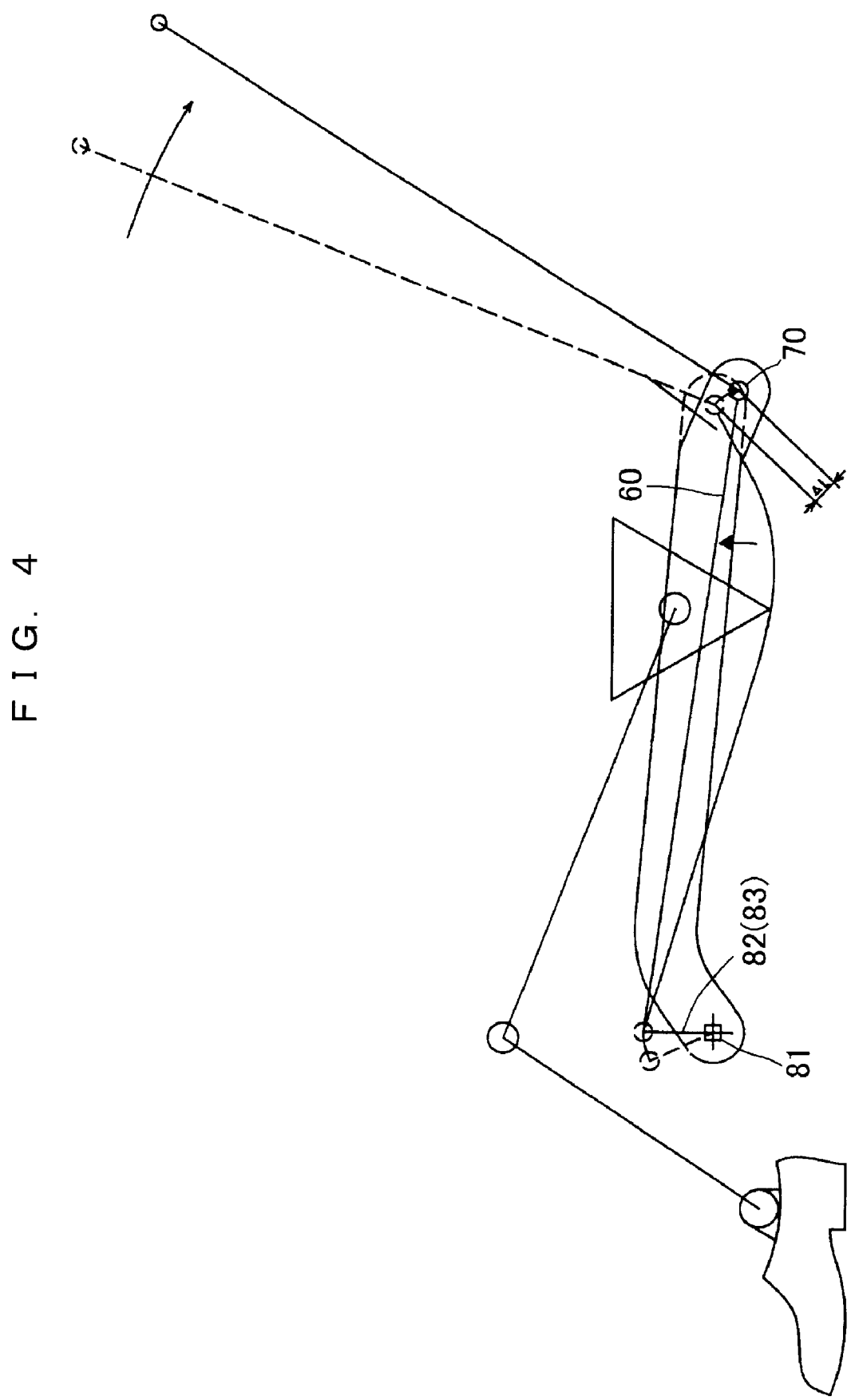
FIG. 4 is a diagram to explain the functioning of the seat structure during impact according to the above-described embodiment.

To vibration imputed via the vehicle body floor during driving, the front torsion bar unit 80 is not affected by the elastic force owing to expansion and contraction of the base net 60 itself due to the effect of component force in the horizontal direction created by load fluctuation and relative movement of the leg and pelvis, which results in a feeling of linear springiness of the torsion bar 81, and damping becomes smaller. At the same time, the torsion bar 81 and the arms 82, 83 (supporting frame 84) sensitively displace, and in particular, effectively absorb the vibration in the range of high frequency region. When a heavy rearward load is applied to the seat back, as shown in FIG. 4, the vicinity in the rear of the side frame of the seat cushion elastically deforms downward, and the rear frame 70 being engaged with the rear end 61 of the base net 60 displaces rearward in a downward-tilting direction. Meanwhile, even when the arms 82 and 83 tilt rearward as much as possible, the pivoting range of the arms 82 and 83 is controlled by abutting the arms on the annular type frames 21*d* and 22*d* acting as stoppers. Accordingly, the base net 60 is given tension in the direction of stretching, which controls deformation of the frames in the seat back. Further, when a large impact is applied, the stoppers deform or displace so that the controlling positions of the arms 82 and 83 shift rearward, the base net 60 is loosened, so that the damping ratio is increased, thereby easing the impact force.

It should be noted that symbol 120 in FIGS. 1 and 2 denotes a lumber support provided on the back surface of a base net 36 for a seat back supported by the back frame 30 so as to be able to abut on an area from the pelvis to the lumbar vertebra. The lumber support 120 uses the same structure as the above-described air cushion 100, and is provided with two bulging portions 121 and 122, in which air bags 121*a* and 122*a* are incorporated, and a flexible plate 123 integrated with the bulging portions. Since it includes the flexible plate 123, compared with a conventional well-known lumber support, the bulging portions work as a sense of hitting with a larger curvature owing to the flexible plate, which gives spring characteristic with high linearity. Accordingly, it becomes possible to follow to a change in curvature of the back bone with the third and fourth lumber vertebrae as a center without using a large force. Thereby possibilizing to support the lumber vertebra and pelvis without a feeling of something foreign. It also has a function to reduce transmission of vibration to the waist due to the spring characteristic with high linearity. In other words, the lumber support 120 has a function not only to support and adjust the waist but also a function to absorb vibration with a high frequency owing to linear spring characteristic. It is possible to structure the air bags 121*a* and 122*a* not to connect to a pump so that air can come in and come out all the time and a damping function due to air flow in the air bags 121*a* and 122*a* can be utilized in such a case.

Figure 8:
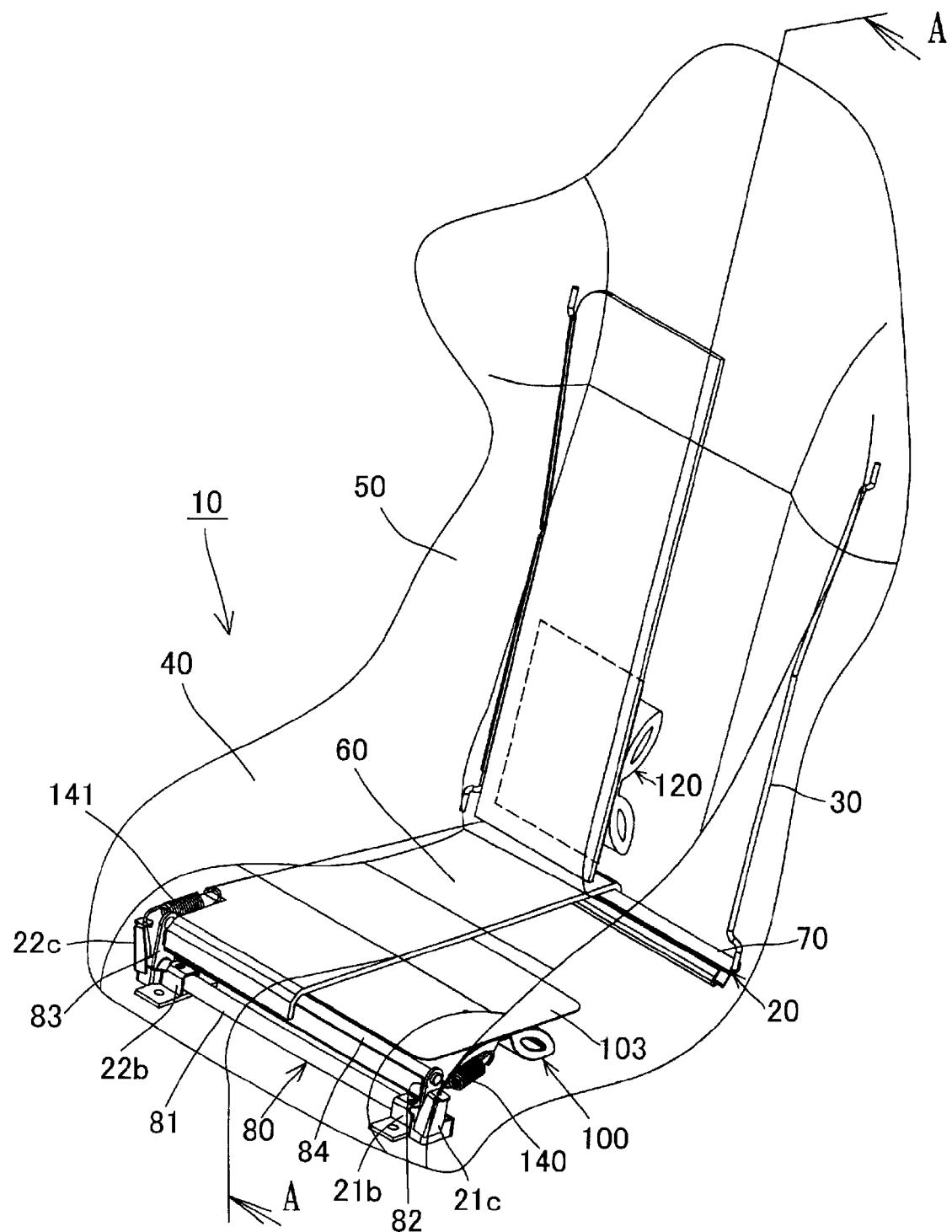
FIG. 8 is a view showing a seat structure according to a second embodiment of the present invention.
Figure 9:
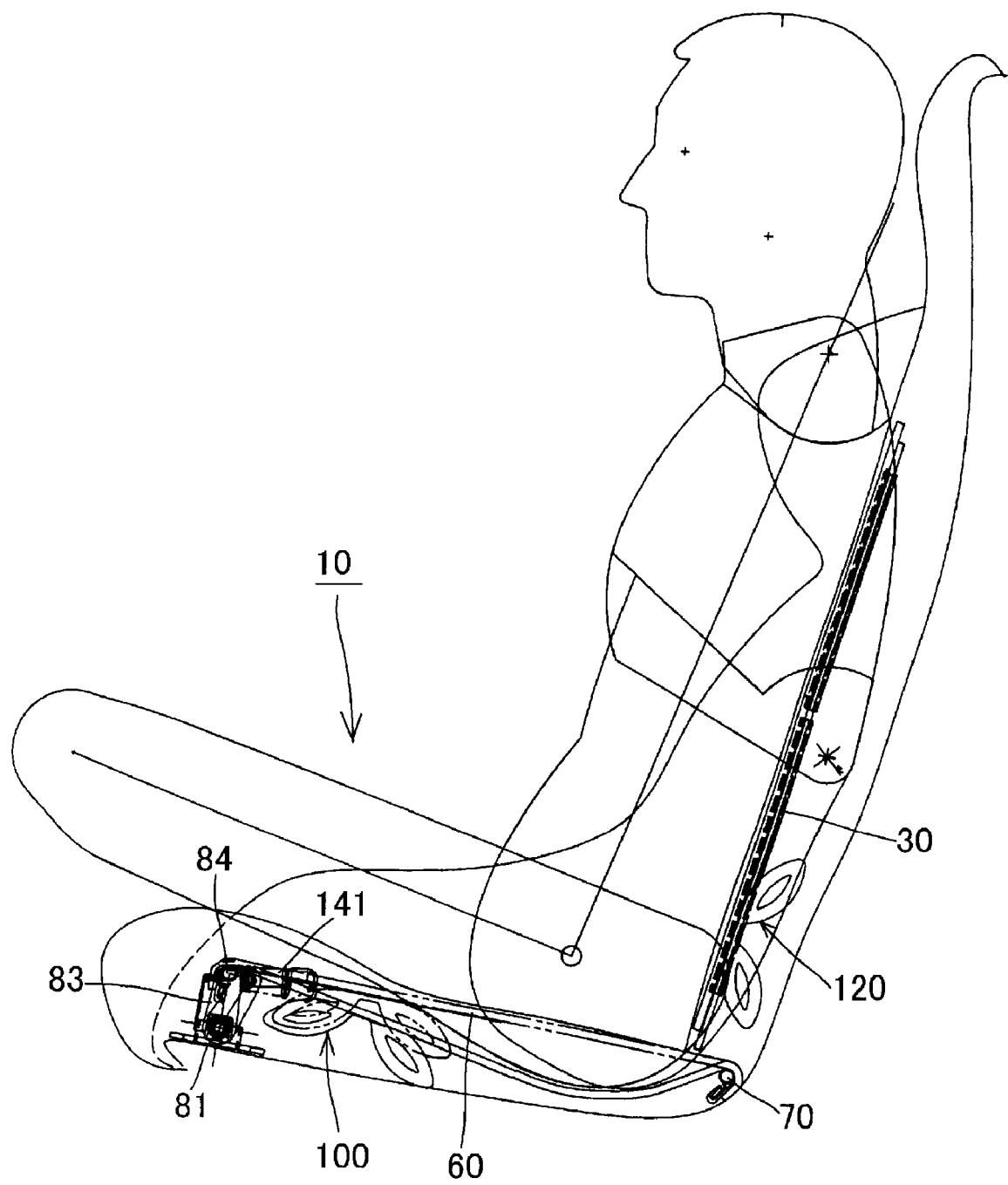
FIG. 9 is a sectional arrow diagram taken from the line A-A in FIG. 8.

FIGS. 8 and 9 show a seat structure 10 according to a second embodiment of the present invention. The seat structure 10 of the present embodiment is provided in the vicinity of the attachment metal fittings 21*b* and 22*b* supporting the torsion bar 81 in the first embodiment, at a position not to hinder movement of the front torsion bar unit 80, and includes an elastic force adjusting springs (hereinafter, referred to as "front elastic force adjusting springs") 140 and 141 composed of coil springs of which one side ends are engaged with portions 21*c* and 22*c* to be engaged for front springs forming a portion of the front frame 20, and the other side ends are engaged with near the respective sides of the front portion 62 of the base net 60. Other structures are the same as those in the first embodiment.

According to the present embodiment, since the seat structure includes the front elastic force adjusting springs 140 and 141, in addition to the elastic forces of the torsion bar 81 of the front torsion bar unit 80, the elastic force of the front elastic force adjusting springs 140 and 141 work. As a result, a structure with a strong feeling of springiness can be realized compared with the first embodiment shown in FIGS. 1 and 2 so that body weight can be more firmly supported. When vibration is inputted, since these front elastic force adjusting springs 140 and 141 work together with the torsion bar 81, it is possible to perform adjustment of a feeling of springiness or a damping property with a simple structure. Furthermore, in the present embodiment, one piece each of the front elastic force adjusting springs 140 and 141 are disposed on each side portion of the base net 60, but the number of springs disposed is not limited.

Figure 11:
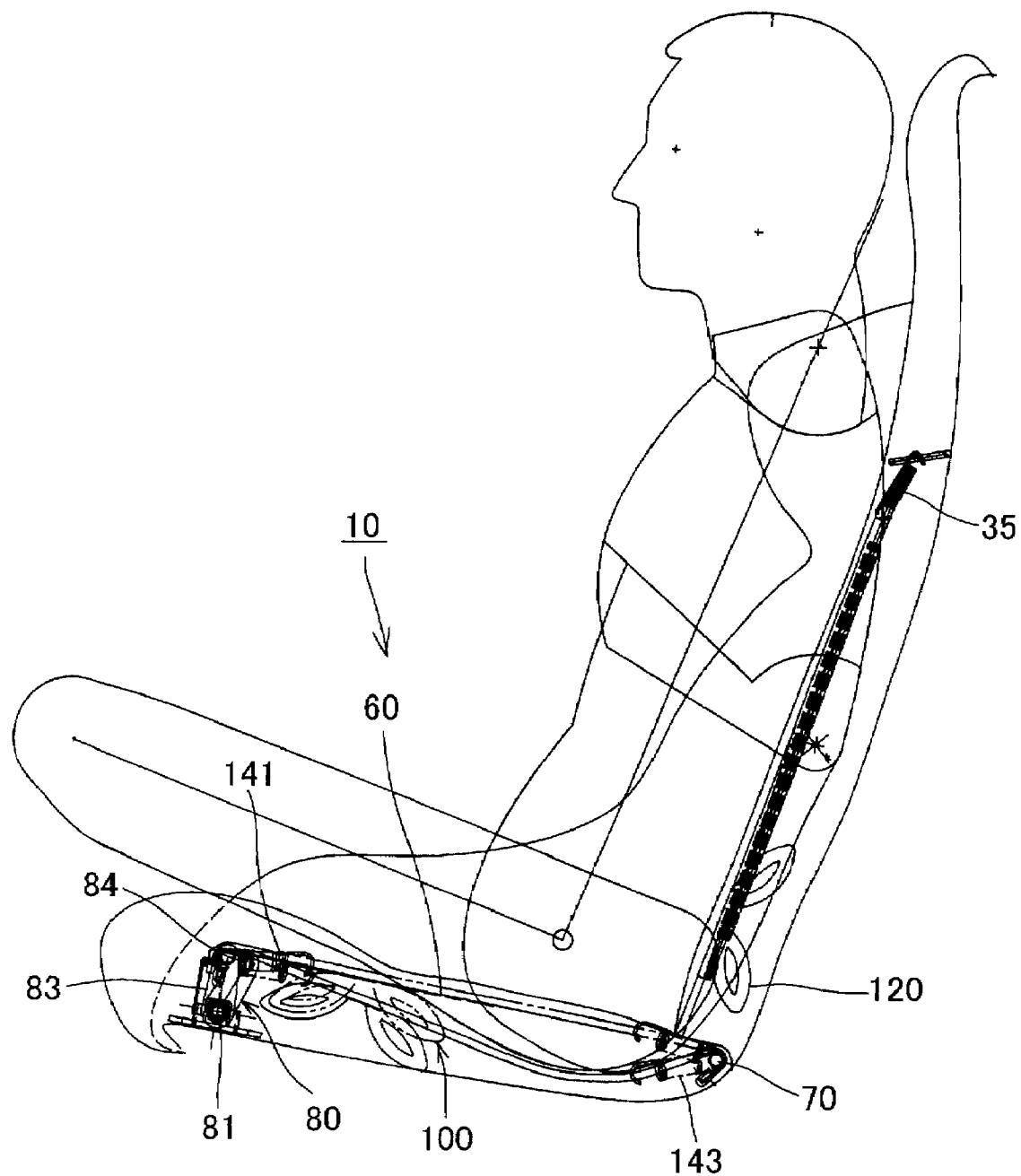
FIG. 11 is a sectional arrow diagram taken from the line A-A in FIG. 10.

FIGS. 10 and 11 show a seat structure 10 according to a third embodiment of the present invention. In the present embodiment, the seat structure includes, in addition to the front elastic force adjusting springs 140 and 141 in the second embodiment, elastic force adjusting springs (hereinafter, referred to as "rear elastic force adjusting spring") 142 and 143 of which the first side ends are engaged with the rear frame 70 and the other side ends are engaged with near the respective sides of the rear portion 61 of the base net 60. Note that the rear frame 70 also serves as portions to be engaged for rear springs in the present embodiment, but a structure providing a portion to be engaged for the rear spring separately from the rear frame 70 is also adoptable.

According to the present embodiment, needless to say that it is possible to enhance a sense of stroke, enhance vibration absorbency, and the like during seating owing to the function of the front torsion bar unit 80, since the seat structure includes rear elastic force adjusting springs 142 and 143, it is also possible to enhance supportability of load applied to the vicinity under the ischium node.

Furthermore, in the present embodiment, the top end of the base net 36 for the seat back is connected to a top frame of the back frame 30 via coil springs 35. By providing the coil springs 35, a sense of stroke and vibration absorbency in the seat back can be enhanced. The coil springs 35 can be provided in other embodiments as necessary.

Though both the front elastic force adjusting springs 140 and 141 and the rear elastic force adjusting springs 142 and 143 are used in the present embodiment, it is of course possible to have a structure without disposing the front elastic force adjusting springs 140 and 141.

Figure 12:
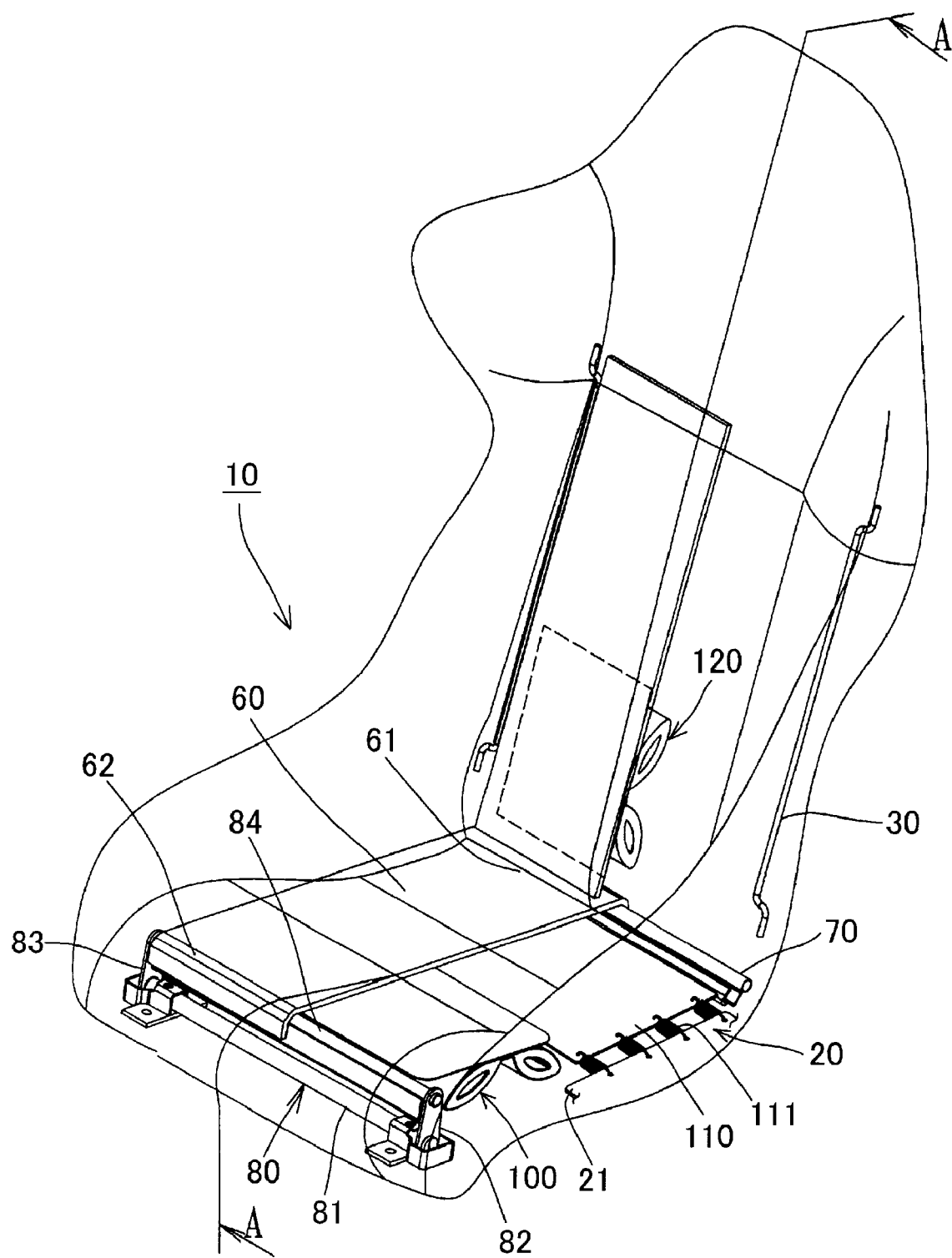
FIG. 12 is a view showing a seat structure according to a fourth embodiment of the present invention.
Figure 13:
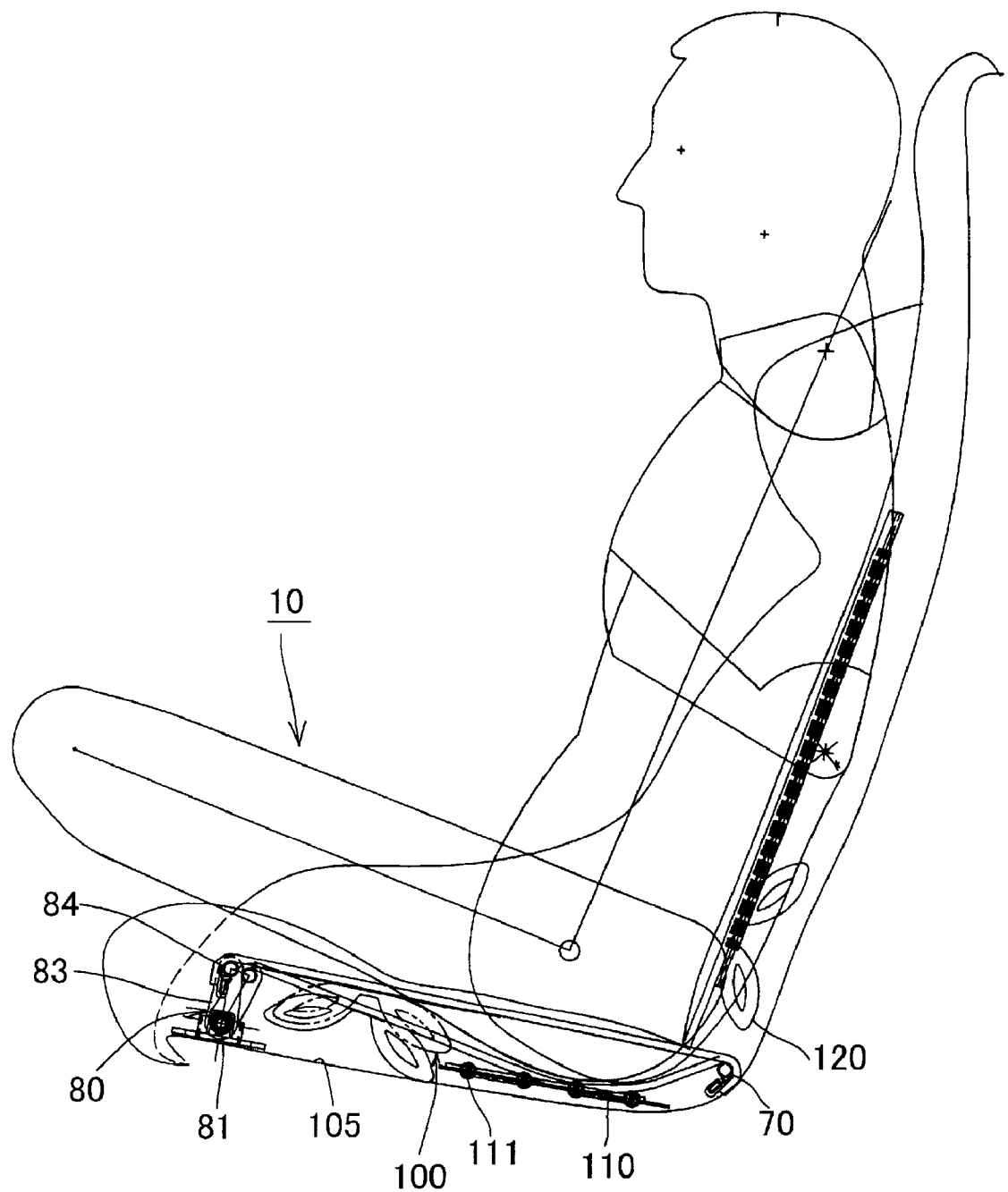
FIG. 13 is a sectional arrow diagram taken from the line A-A in FIG. 12.

FIGS. 12 and 13 show a seat structure according to a fourth embodiment of the present invention. The present embodiment has a structure such that a rear auxiliary net 110 is disposed downward at a position corresponding to the vicinity from near the center to the rear of the base net 60, independent of the base net 60, and elastically fixed to the side frame 21 composing a portion of the seat frame 20 via a coil spring 111, and other structures are completely the same as the first embodiment. Similarly to the base net 60, the rear auxiliary net 110 can use a two dimensional cloth (knitting, fabrics, net, etc.) or a solid knitted fabric (a three-dimensional net member) or the like. A portion corresponding to the vicinity from near the center to the rear of the base net 60 is positioned below the human ischium node. Though a supporting load is great at the portion, owing to existence of the rear auxiliary net 110, further suppression of the sense of bottom touch can be realized during imputing of a large load. When a net having a small spring constant is used as the rear auxiliary net 110, a damping property on the seat cushion is increased, whereas that having a large spring constant is used, the feeling of springiness on the seat cushion is increased. Therefore, it is possible to adjust the damping property and feeling of springiness of the whole seat cushion. Note that it is also possible in the present embodiment to provide the respective elastic force adjusting springs 140 to 143 shown in the second and third embodiments as necessary.

Figure 14:
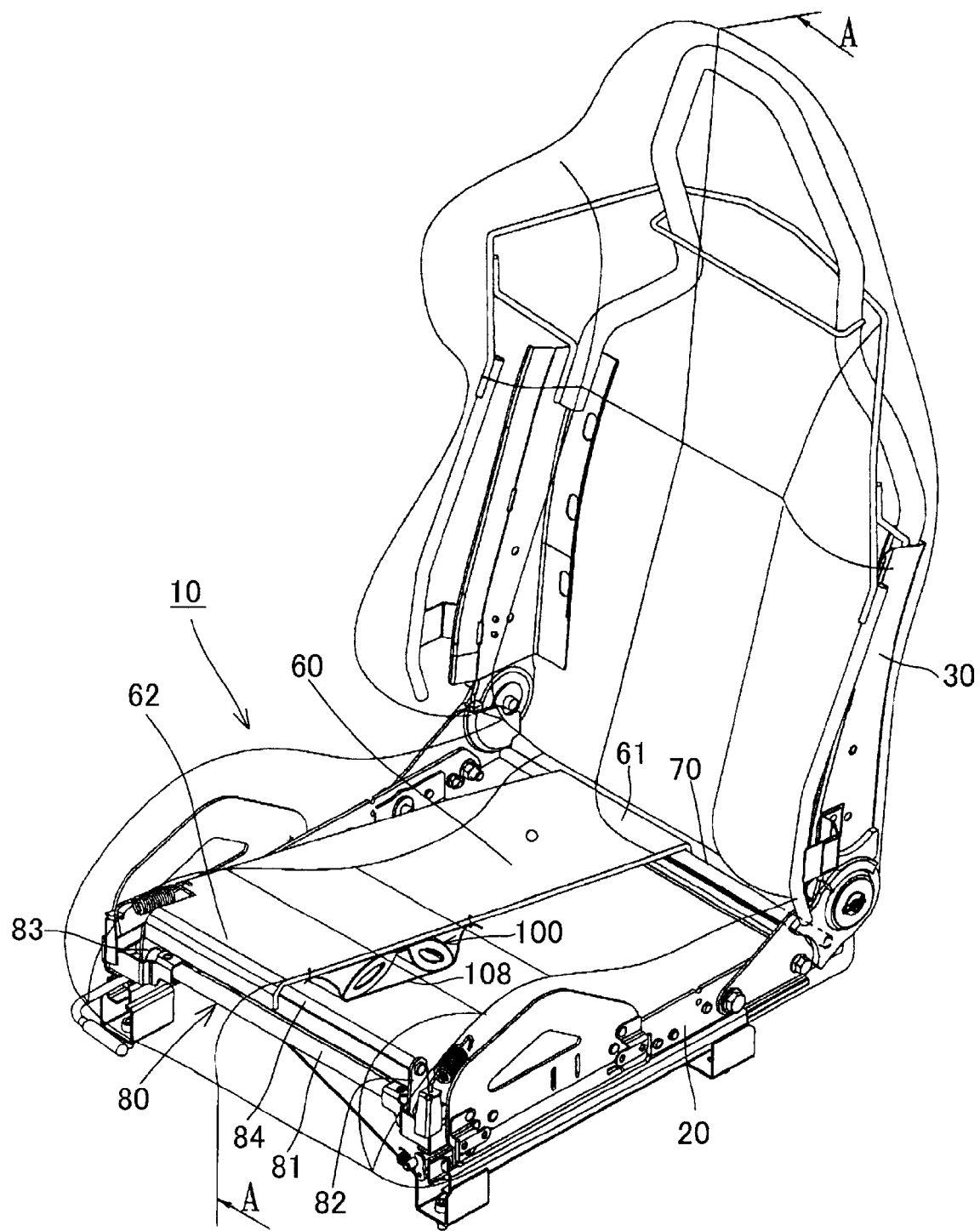
FIG. 14 is a view showing a seat structure according to a fifth embodiment of the present invention.
Figure 15:
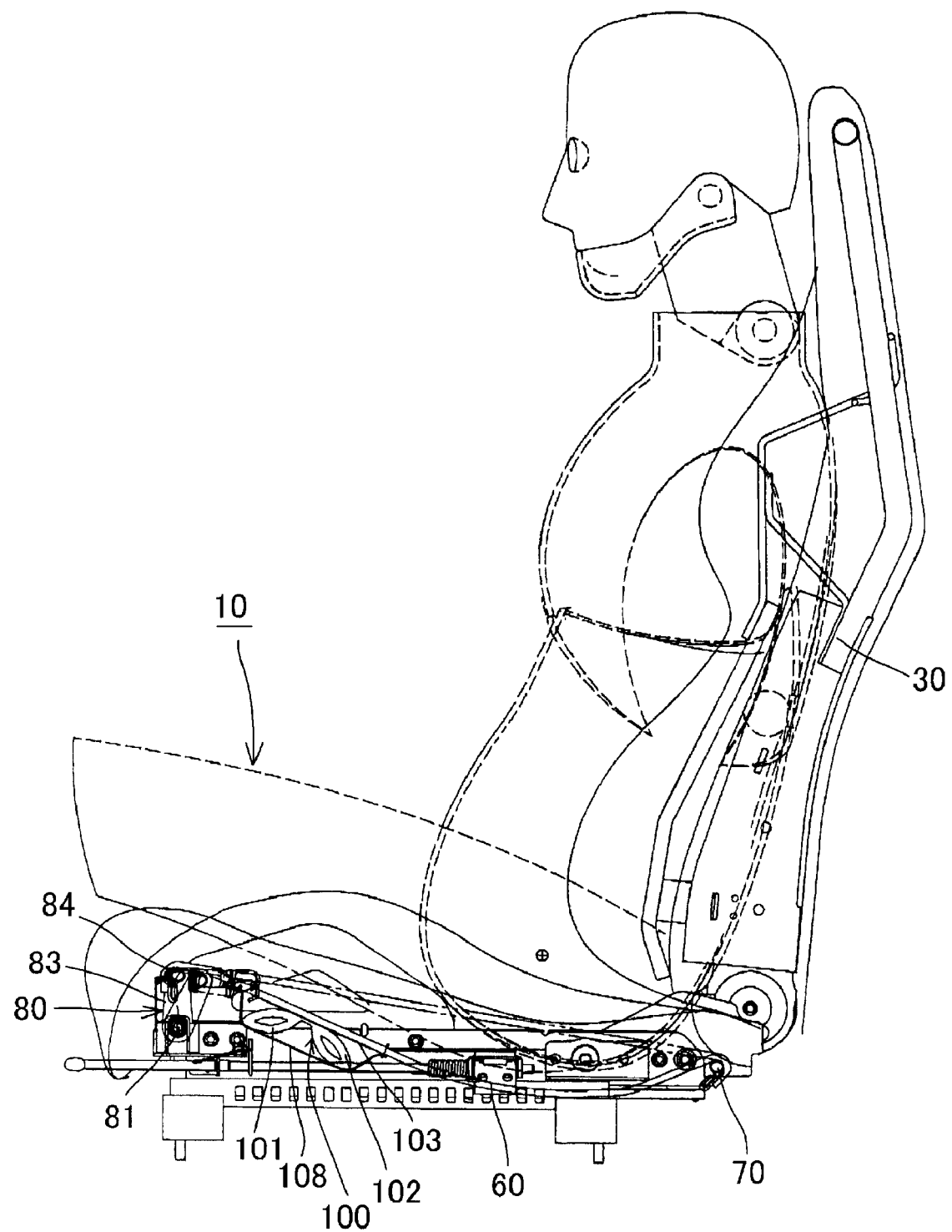
FIG. 15 is a sectional arrow diagram taken from the line A-A in FIG. 14.

FIGS. 14 and 15 are views showing a fifth embodiment of the present invention. The present embodiment is characterized in that the air cushion 100 used in the above-described respective embodiments is structured to be covered with cloth material 108 provided by connecting the end to the base net 60, in other words, the air cushion 100 is inserted in the bag-shaped cloth material 108. When a human is seated or vibration is inputted, a range (area) surrounded by the base net 60 and the cloth material 108 is changed by tension change, the shape of the air cushion 100 contacted with them changes so that the elasticity of the air cushion 100 works. In the embodiment shown in the above-described respective embodiments, an auxiliary plate 105 is disposed below the air cushion 100 so as to let the elasticity of the air cushion 100 work. However, in the present embodiment, by disposing such a cloth material 108, provision of the auxiliary plate 105 to the seat frame 20 becomes unnecessary, which contributes to the simplification of the structure of and the weight reduction of the seat frame 20. Needless to say that such a cloth material 108 can be used in the above-described respective embodiments.

Figure 16:
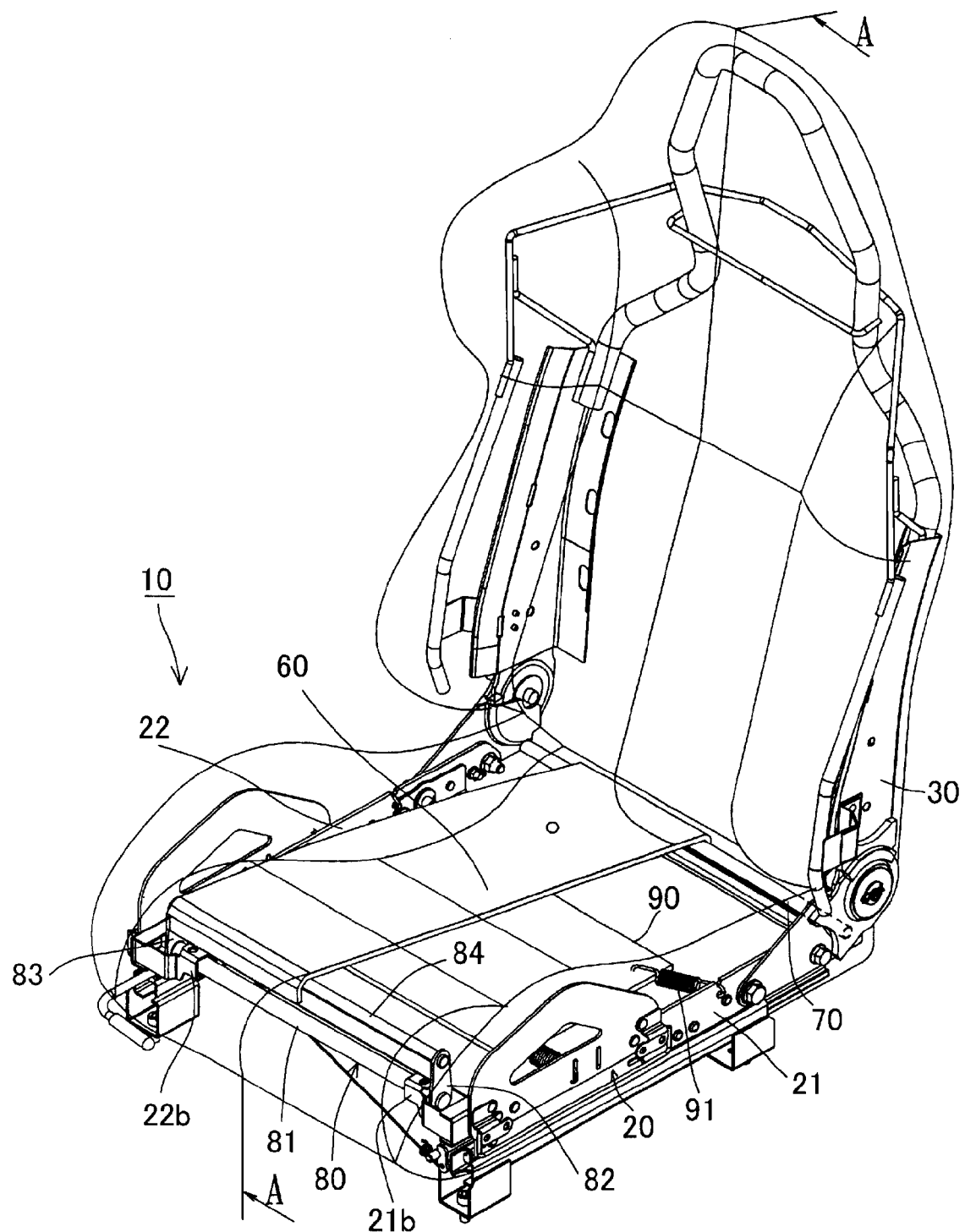
FIG. 16 is a view showing a seat structure according to a sixth embodiment of the present invention.
Figure 17:
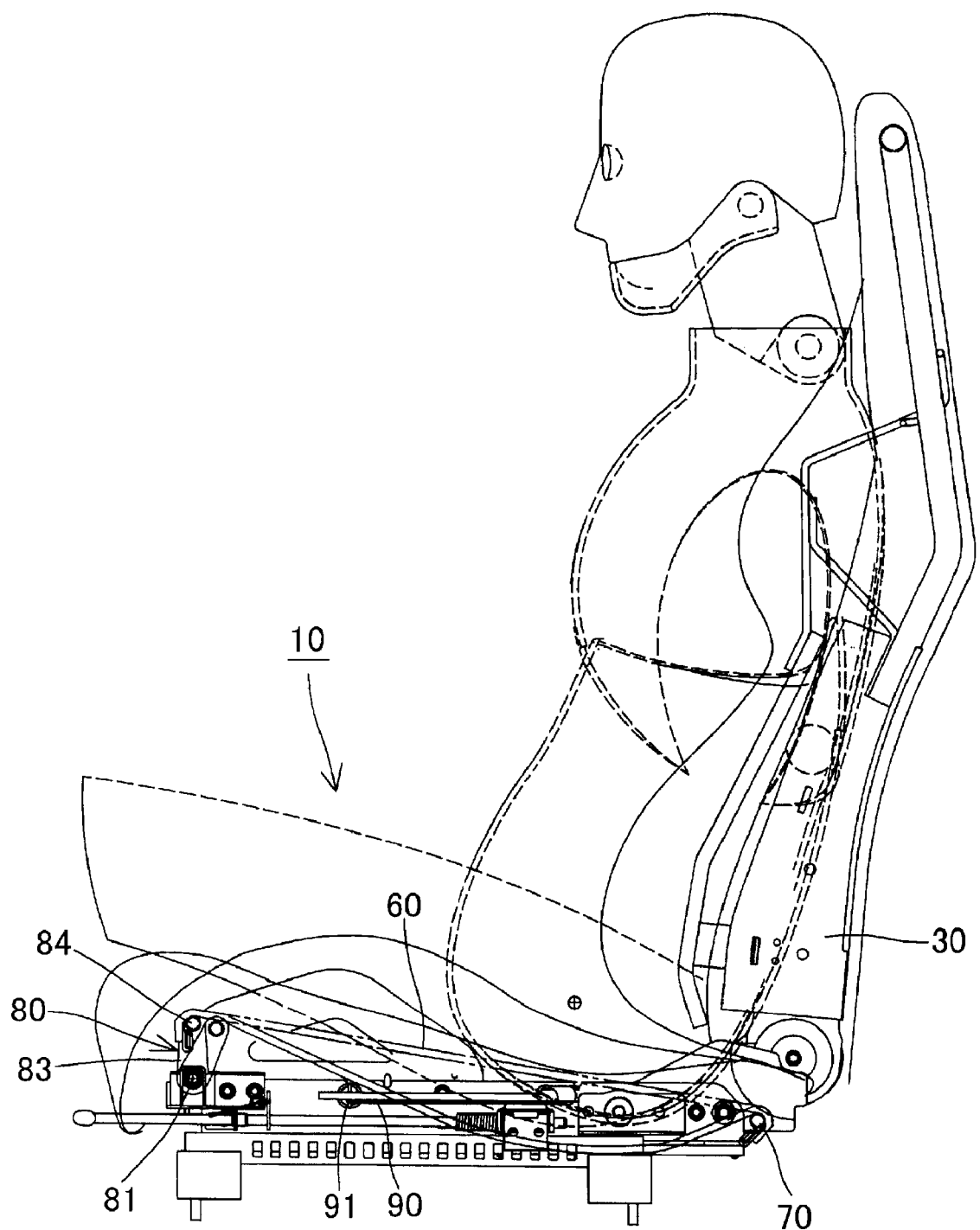
FIG. 17 is a sectional arrow diagram taken from the line A-A in FIG. 16.

FIGS. 16 and 17 show a seat structure according to a sixth embodiment of the present invention. In the first to fourth embodiments, the air cushion 100 is used as the auxiliary elastic mechanism disposed under the base net 60, while the present embodiment has a structure such that, instead of the air cushion 100, an auxiliary net 90 extending from near the center to the vicinity of the front of the base net 60 is stretched across the side frames 21 and 22 composing a portion of the seat frame 20 via coil springs 91. The above-described two-dimensional cloth, the solid knitted fabric, or the like can be used as the auxiliary net 90. The auxiliary net 90 can exhibit functions to firmly support body weight and prevent bottom touch similar to the air cushion 100 in the first to fourth embodiments. Since it is disposed at a position corresponding to an area from near the center of the base net 60 to the vicinity of the front thereof, which is a little further forward than a position corresponding to the point under the ischium node of a human when a person is seated, functions to prevent forward displacement of the buttocks and to maintain a stable seating posture at the time of seating, are exhibited.

Figure 18:
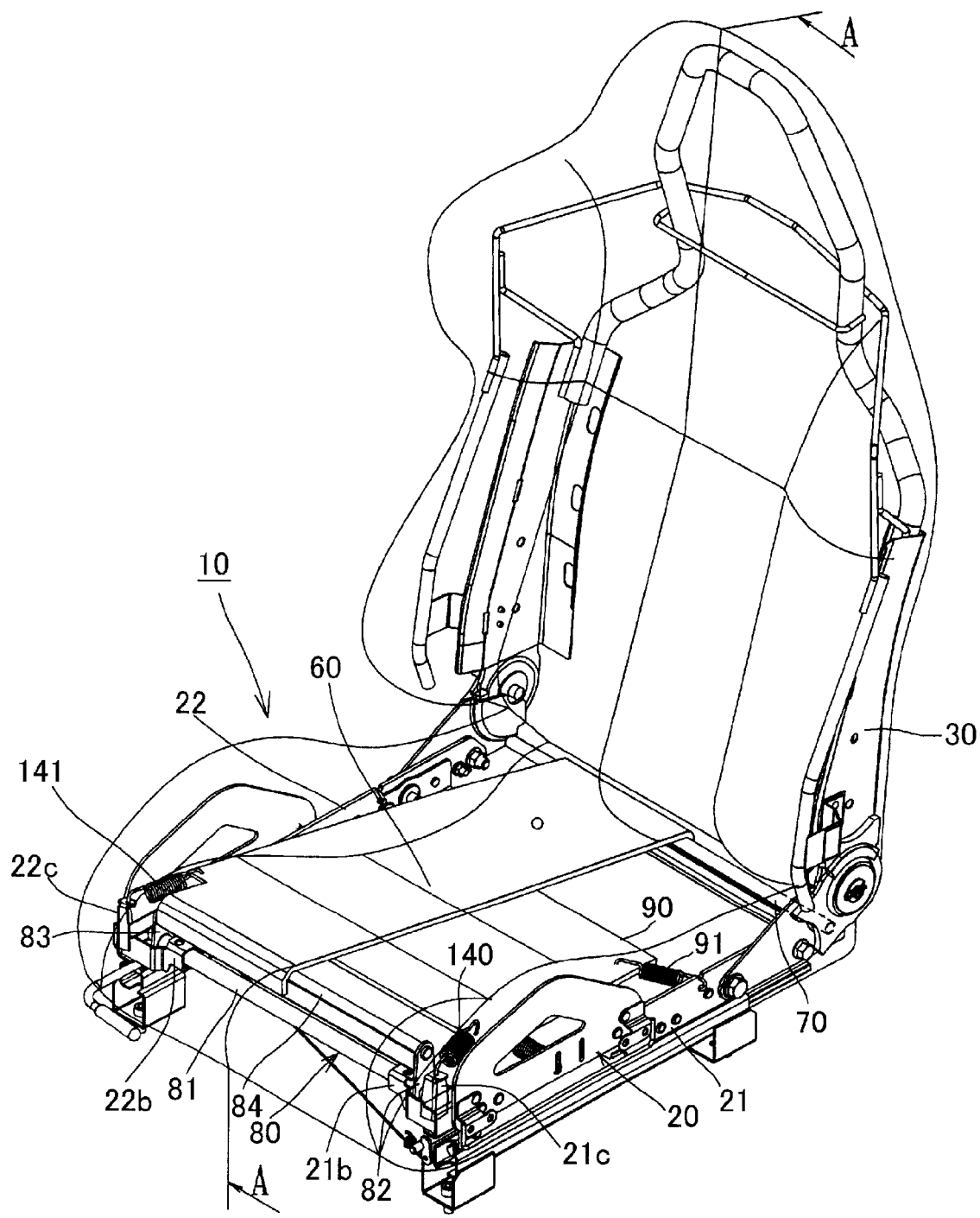
FIG. 18 is a view showing a seat structure according to a seventh embodiment of the present invention.
Figure 19:
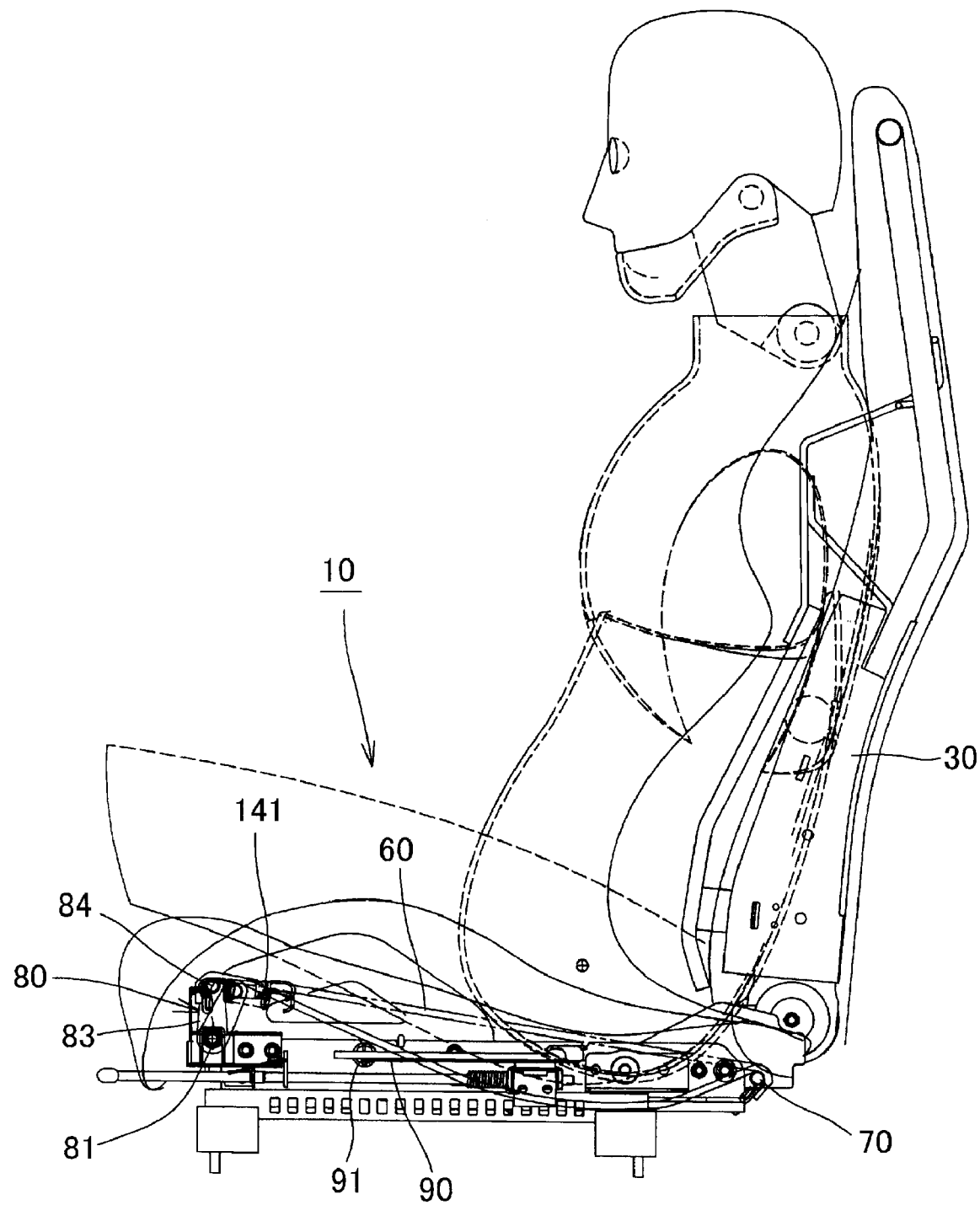
FIG. 19 is a sectional arrow diagram taken from the line A-A in FIG. 18.
Figure 20:
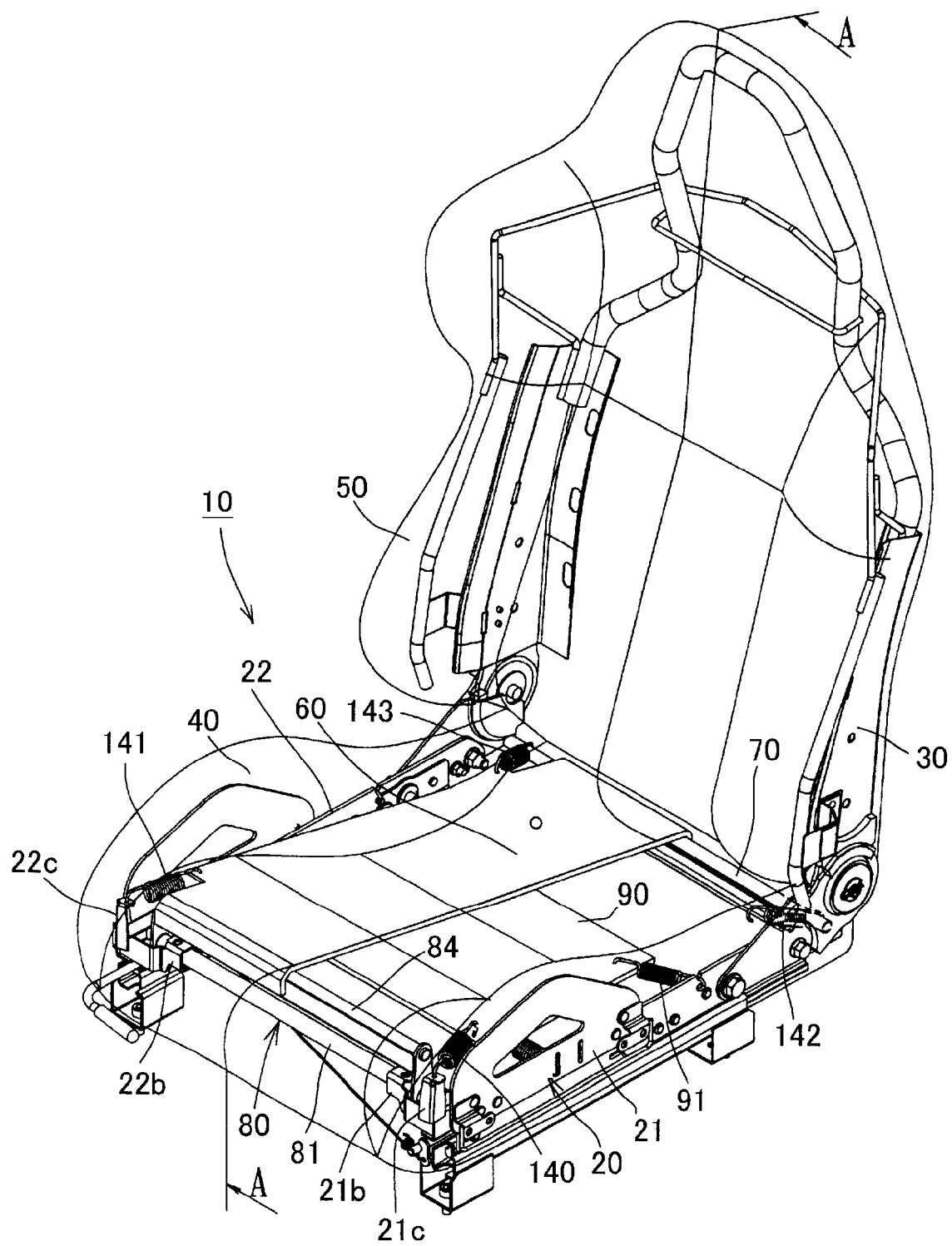
FIG. 20 is a view showing a seat structure according to an eighth embodiment of the present invention.
Figure 21:
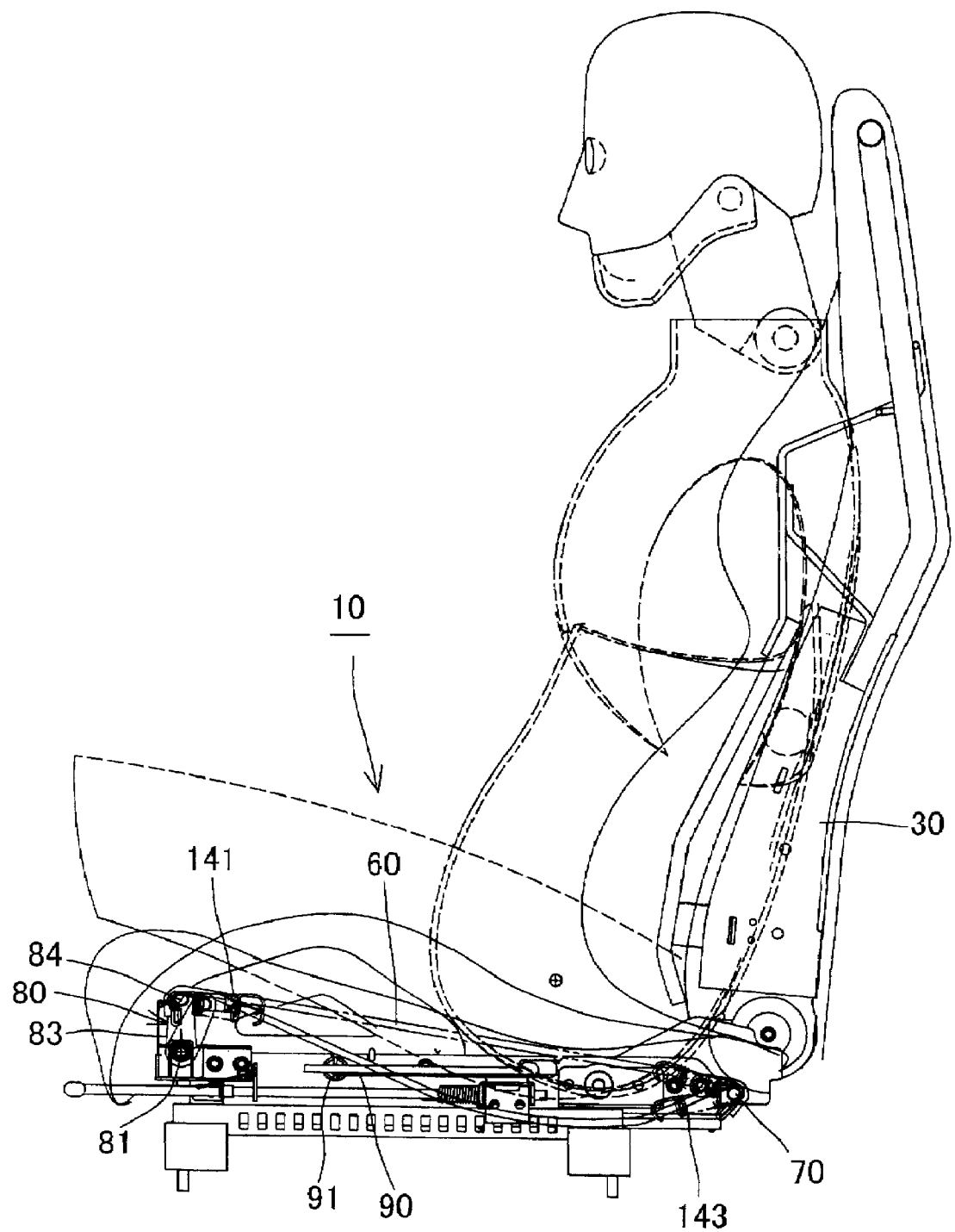
FIG. 21 is a sectional arrow diagram taken from the line A-A in FIG. 20.

It is also possible in this case to make a structure such that the front elastic force adjusting springs 140 and 141 are disposed to complement an elastic function of the front torsion bar unit 80 as in the seventh embodiment shown in FIGS. 18 and 19, similarly to the above-described second embodiment. And, again, it is possible to make a structure such that the rear elastic force adjusting springs 142 and 143 are further disposed as in the seat structure 10 according to the eighth embodiment of the present invention shown in FIGS. 20 and 21.

Figure 22:
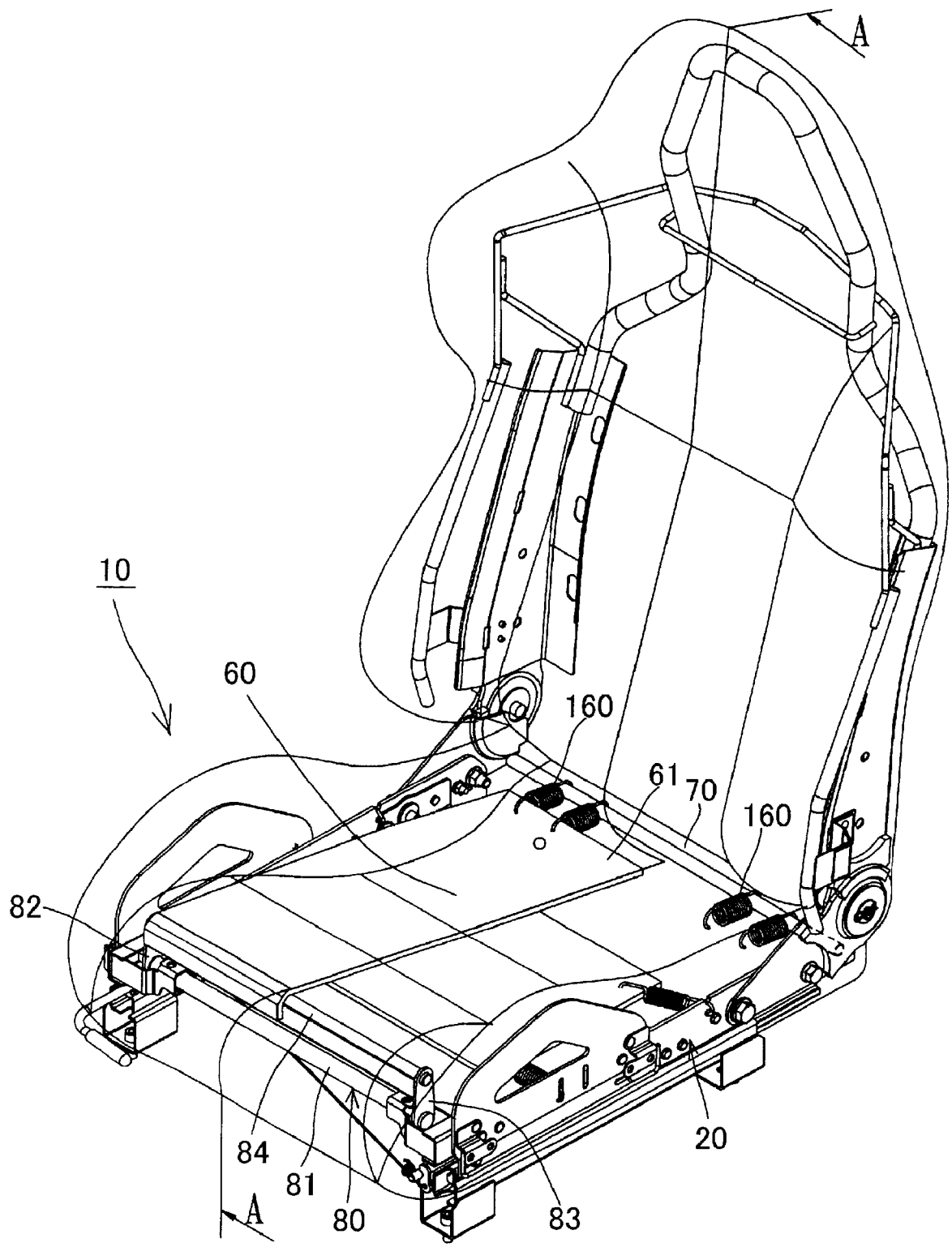
FIG. 22 is a view showing a seat structure according to a ninth embodiment of the present invention.
Figure 23:
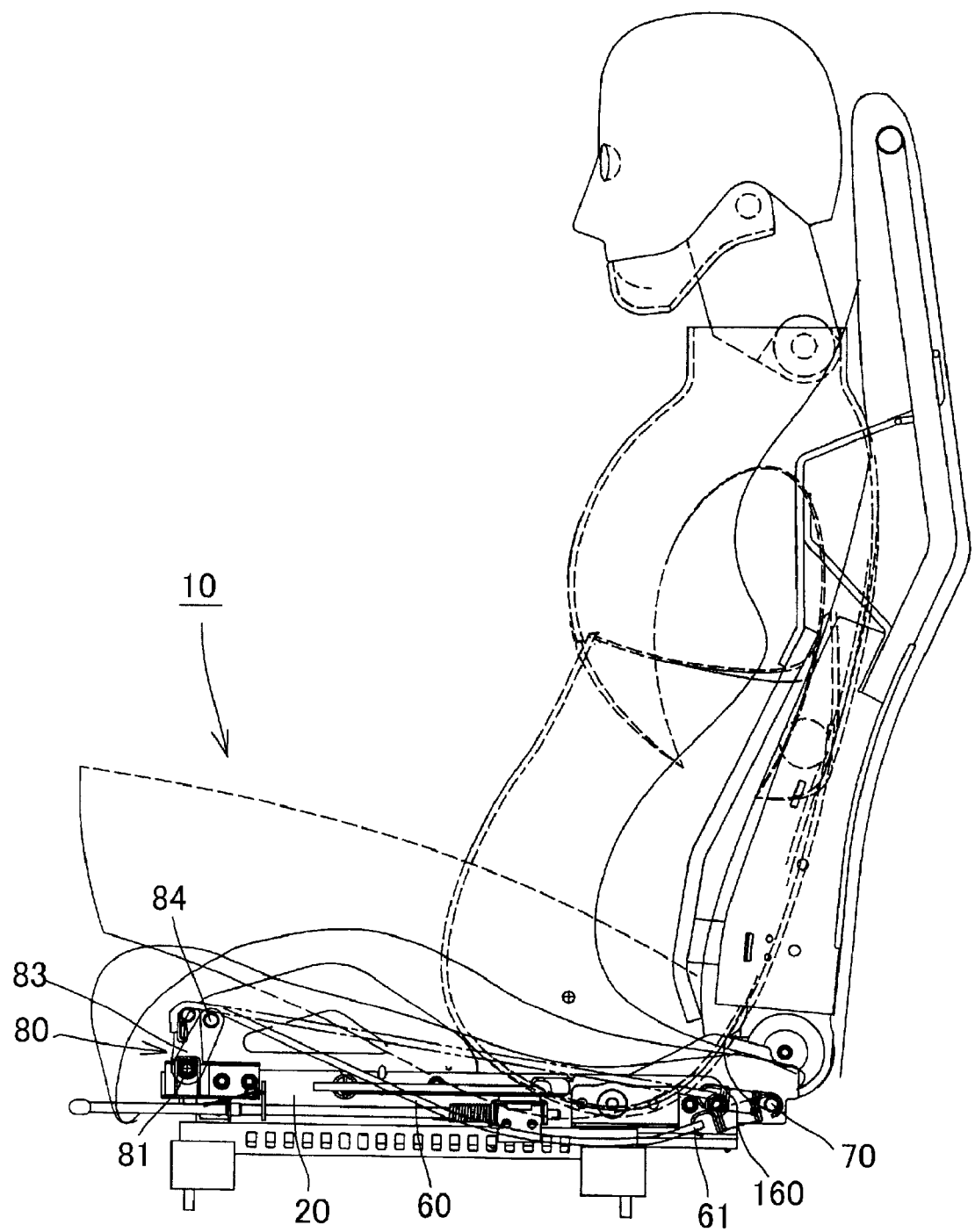
FIG. 23 is a sectional arrow diagram taken from the line A-A in FIG. 22.
Figure 24:
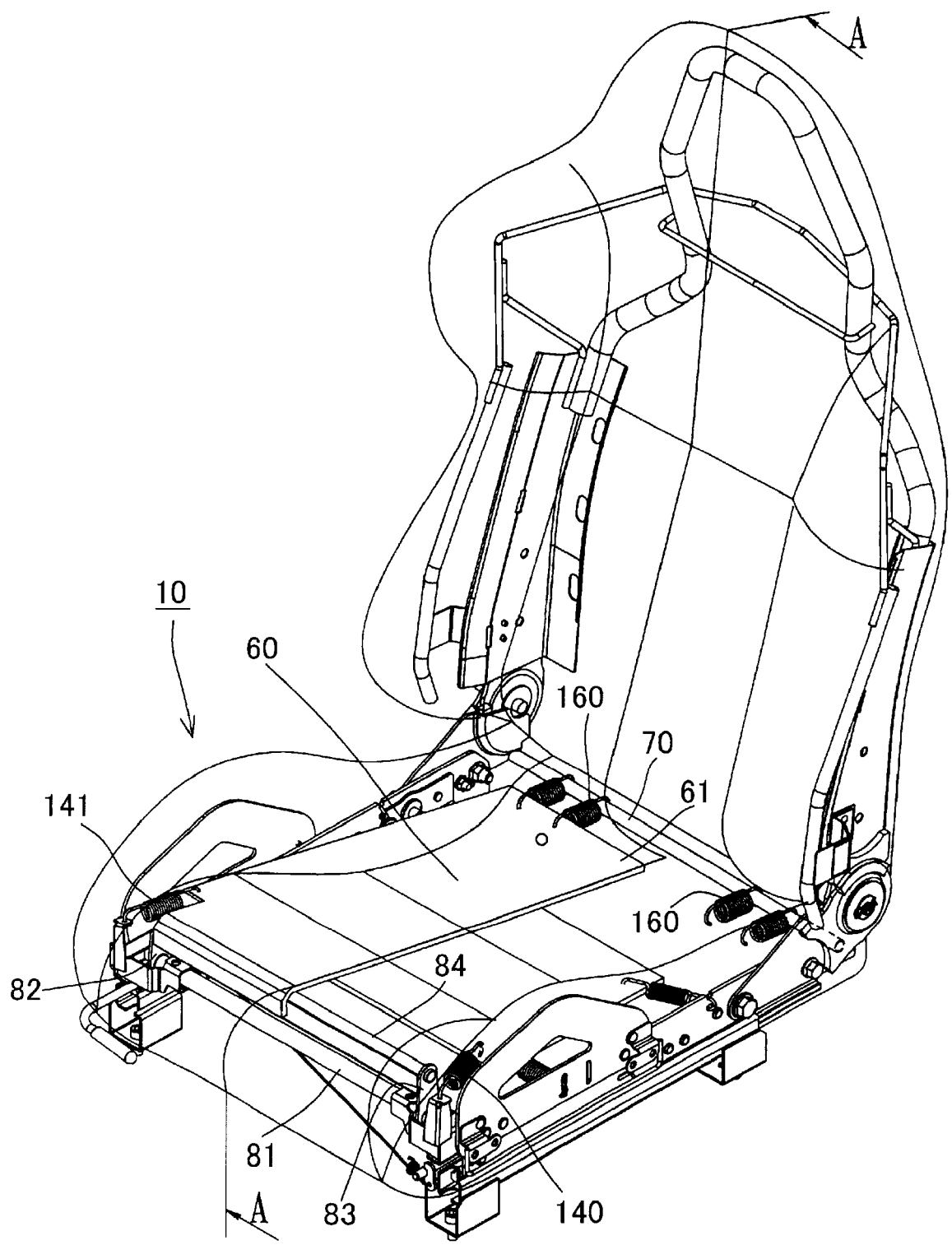
FIG. 24 is a view showing a seat structure according to a tenth embodiment of the present invention.
Figure 25:
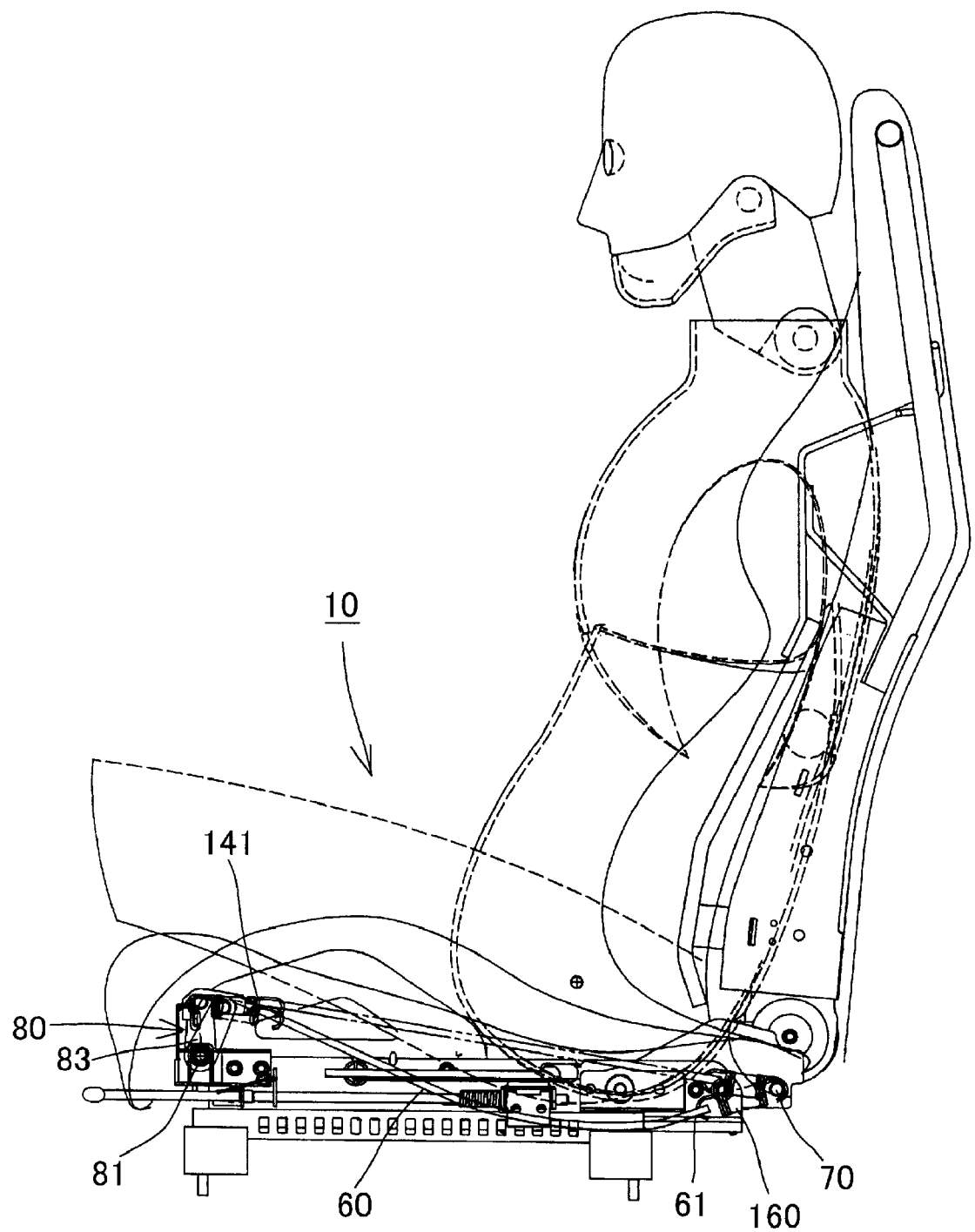
FIG. 25 is a sectional arrow diagram taken from the line A-A in FIG. 24.

As in the ninth embodiment shown in FIGS. 22 and 23, in the tenth embodiment shown in FIGS. 24 and 25, it is possible to connect the rear end 61 of the base net 60 with the rear frame 70, not directly, but via the coil springs 160. When structuring in this way, since the elastic force of the coil spring 160 functions when a load is applied to the rear end side of the base net 60, a sense of stroke on the rear end 61 side is increased compared with those shown in the above-described respective embodiment, which results in a seat structure 10 to perceive a feeling of much softer support at the time of seating. Further, it causes phase delay at the time of resonance, and make a resonance peak lower. Therefore, it is possible to make such a structure according to the physique, body weight, or choice of a user. The ninth embodiment shown in FIGS. 22 and 23 and the tenth embodiment shown in FIGS. 24 and 25 differ from each other in a point that the front elastic force adjusting springs 140 and 141 are provided in the latter.

The disposed coil spring 160 (spring constant k 2) shown in FIGS. 22 to 25 takes a series arrangement spring structure with the torsion bar 81 (spring constant k 1) of the front torsion bar unit 80 via the base net 60. Accordingly, the spring constant becomes smaller from k 1 to (k 1×k 2)/(k 1+k 2), and the damping ratio becomes large because both work together, which is great characteristics of the damping.

Figure 26:
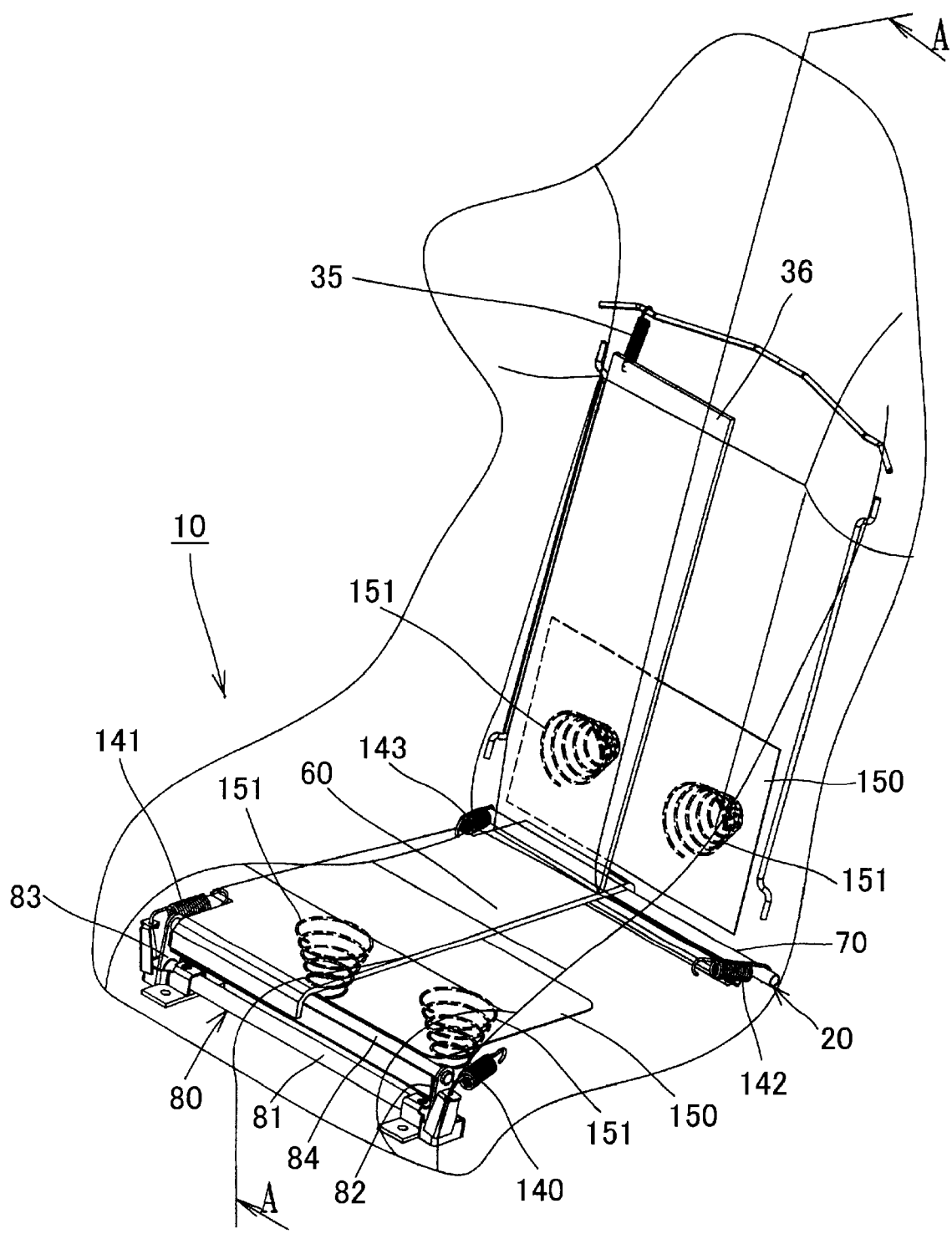
FIG. 26 is a view showing a seat structure according to an eleventh embodiment of the present invention.
Figure 27:
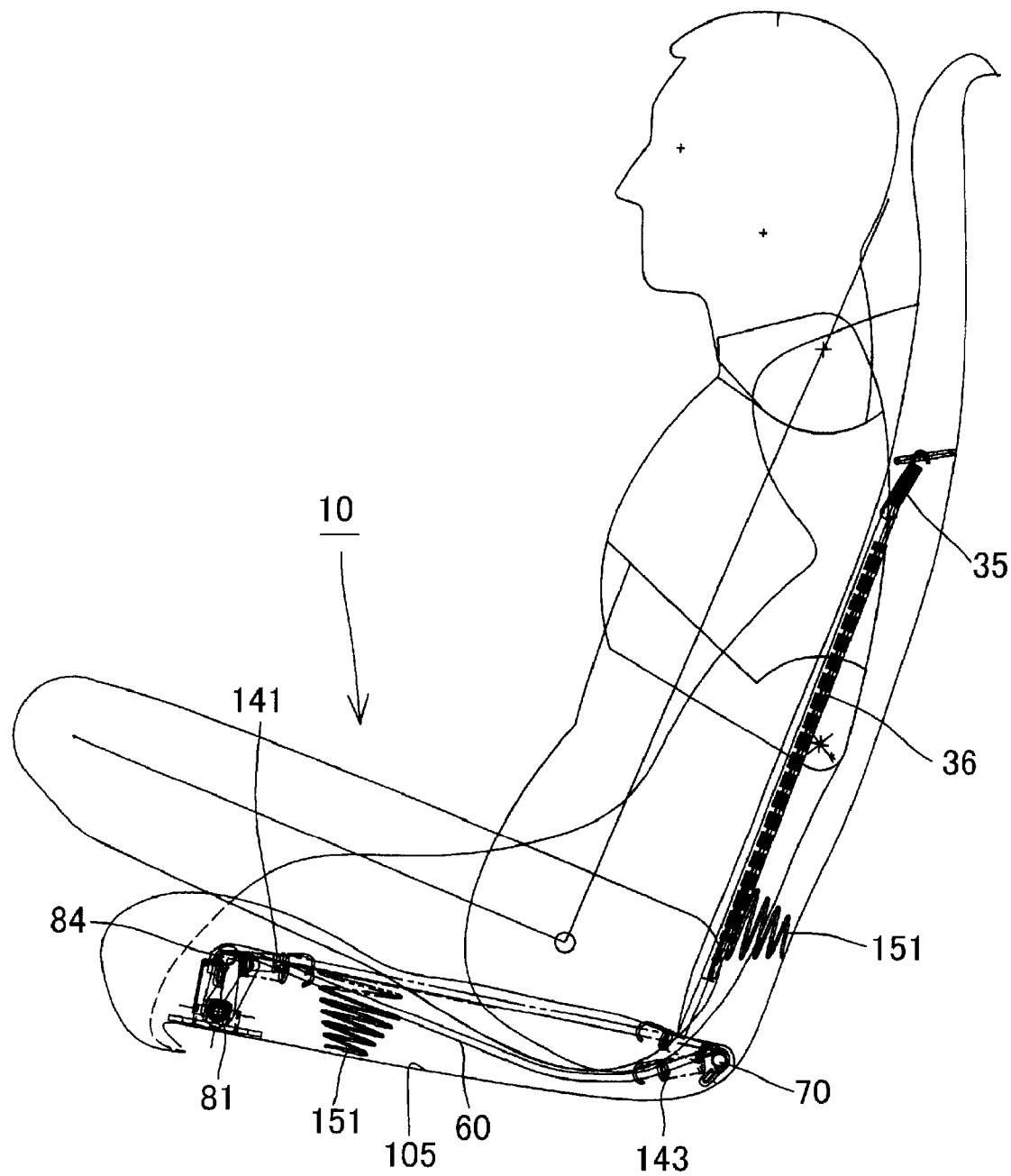
FIG. 27 is a sectional arrow diagram taken from the line A-A in FIG. 26.

FIGS. 26 and 27 shows a seat structure according to an eleventh embodiment of the present invention, in which a member composed of a flexible plate 150 provided so as to abut on the back surface of the base net 60, and an auxiliary coil spring 151, of which one end is abutted on the flexible plate 150 and the other end is abutted on the auxiliary frame 105 forming a portion of the seat frame 20 is used instead of a member provided with the air cushion 100 and a member provided with the auxiliary net 90. This structure also exhibits the respective functions such as supporting body weight, preventing bottom touch, and stability enhancement of seating posture. Moreover, in the present embodiment, an auxiliary elastic mechanism composed of the flexible plate 150 and the auxiliary coil spring 151 disposed on the back surface is disposed also on the back surface side of the back base net 36 to use as a lumber support. Since the auxiliary elastic mechanism includes the flexible plate 150, similarly to the lumber support 120 formed by combining the air cushion shown in FIGS. 1, 2 and the flexible plate 123, it is possible to suppress oppression on the nerve system between the third lumber vertebra and the fourth lumbar vertebra, and support the lumber vertebrae and the pelvis without a feeling of something foreign. Further, it is also possible to reduce transmission of vibration to the waist owing to highly linear spring characteristics. Moreover, it is possible to absorb the curvature variation of the backbone created by barycentric shift without causing large load fluctuation and control change of the body pressure dispersivity caused by curvature variation of the backbone to a small range.

Though the front elastic force adjusting springs 140, 141 and the rear elastic force adjusting springs 142, 143 are disposed in the present embodiment, as described above, it is needless to say that a structure without disposing these elastic force adjusting springs 140 to 143, and a structure disposing any one side only, are adoptable. Furthermore, in the present invention, it takes a structure in which the top end of the base net 36 for the seat back is connected to the top frame of the back frame 30 via a coil spring 35, so that a sense of stroke and vibration absorbency in the seat back are enhanced similarly to the third embodiment.

TEST EXAMPLE

The vibration transmissivity was measured for a seat structure according to the embodiment of the present invention shown in FIGS. 1 and 2 (referred to as "spring constant fixed: front torsion bar"). Note that a two-dimensional cloth material is used as the base net 60, a solid knitted fabric is used as the cushioning member 40 for the seat cushion and they are stretched across the seat frame 20 at a rate of elongation less than 5% in the seat structure used in the test. Further, as a comparison, vibration transmissivity was measured for a structure without providing a front torsion bar unit 80 as in the seat structure shown in FIGS. 1 and 2, fixedly engaging the front of the base net 60 with the front frame which is stretched across the front ends of the side frames of the seat frame 20, and providing a torsion bar unit in the rear of the seat cushion (referred to as "spring constant fixed: rear torsion bar" in FIG. 28), and for a conventionally well known seat structure (referred to as "full-foam urethane" in FIG. 28) without providing a torsion bar unit and providing high density and high elasticity urethane foam having a thickness of 90 mm as a seat frame. It should be noted that a structure providing a torsion bar unit in the rear of the seat cushion (referred to as "spring constant fixed: rear torsion bar" in FIG. 28) has the same structure as disclosed in Patent Document 1 (Japanese Patent Application Laid-open 2004-347577), in which a torsion bar is placed at the top, arms are protruded downward, and a supporting frame to connect the rear of the base net 60 to the arms is attached.

The vibration transmissivity was measured in such that the above-described each seat structure is attached to a platform of a vibrator, an acceleration sensor is attached to the cushioning member for the seat cushion in the vicinity corresponding to a position under the ischium node, a Japanese male having body weight of 58 kg is seated to each seat structure, and vibration is applied with a sine-wave of one-sided amplitude 1 mm (vertical interpeak amplitude 2 mm), changing the vibration frequency from 0.5 Hz to 15 Hz for 180 sec. The result is shown in FIG. 28.

As for the full-foam urethane, since the resonance point exceeds 5 Hz, and vibration transmissibility of the resonance point is as low as 1.7 Hz, it shows the worst value of the vibration absorbency in a high frequency zone equal to or greater than 8 Hz. Whereas, in a structure in which a torsion bar unit is provided in the rear of the seat cushion (referred to as "spring constant fixed: rear torsion bar" in FIG. 28), it is found that compared with full-foam urethane, the resonance point is shifted a little toward the lower frequency side, the vibration transmissibility is increased, and a feeling of springiness becomes strong. As a result, it becomes clear that the vibration absorbency of a high frequency zone is more improved compared with full-foam urethane.

Figure 28:
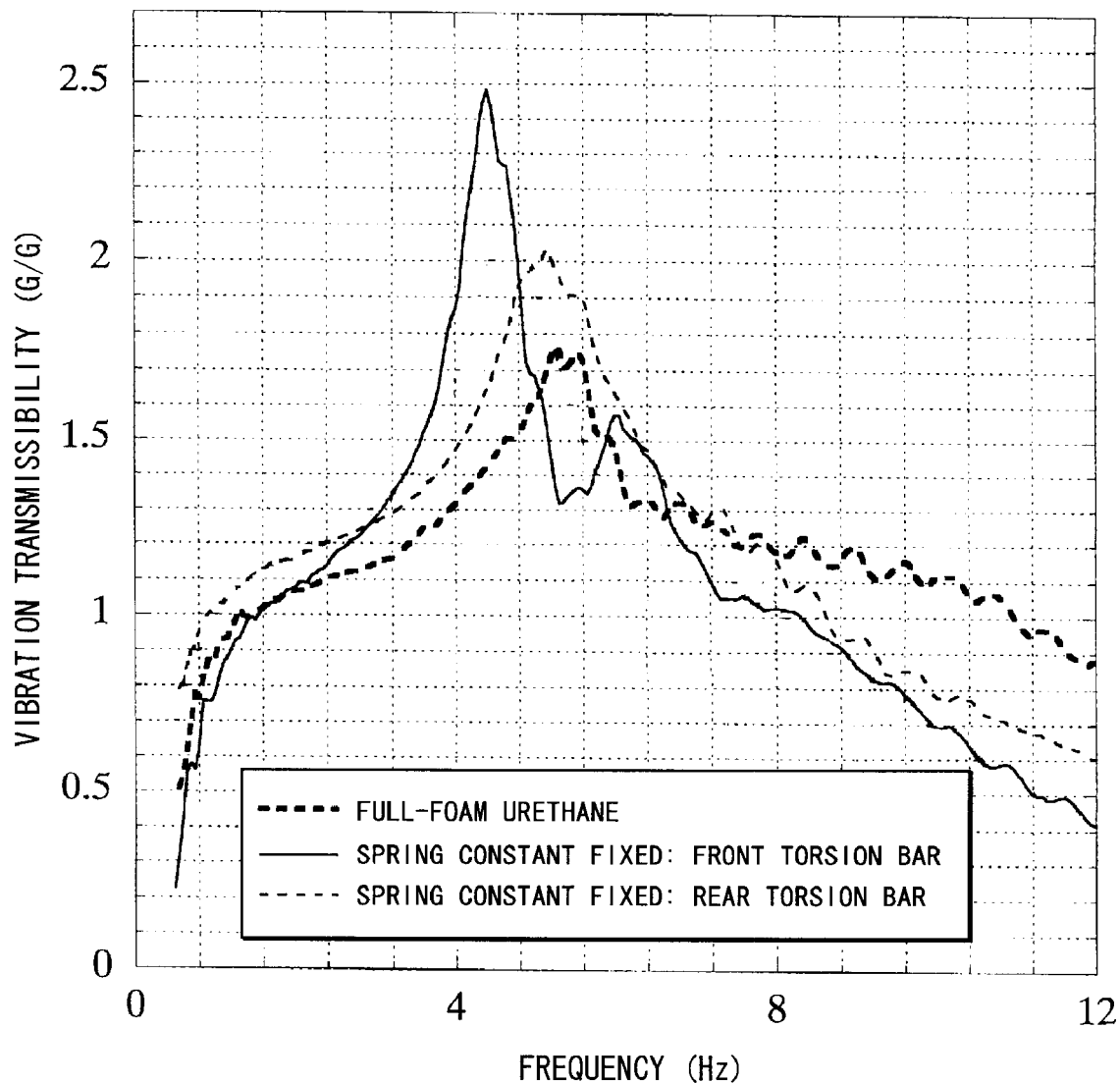
FIG. 28 is a view showing a result of vibration transmissibility measurement in a test example.

In the seat structure according to the embodiment of the present invention (referred to as "spring constant fixed: front torsion bar" in FIG. 28), compared with the seat structure in which a torsion bar unit is provided in the rear of the seat cushion (referred to as "spring constant fixed: rear torsion bar" in FIG. 28) the resonance point is further shifted toward the lower frequency side and the vibration transmissibility at the resonance point is increased. This is because the operation efficiency of the front torsion bar unit 80 is more superior than the case of providing a torsion bar unit in the rear of the seat cushion, damping due to expansion and contraction of the base net 60 itself becomes small, and a feeling of springiness becomes strong. Accordingly, the vibration absorbency in a high frequency zone is further improved.

According to the present invention, it has a structure such that a torsion bar unit is provided in the front of the seat cushion, and the front end of a base net swings and displaces in front and behind. Accordingly, since arms and a supporting frame of the front torsion bar unit, which places in the front of the seat cushion pivot forward around a torsion bar, and the direction of the movement is substantially consistent with the direction of movement of the knee during pedal operation or the like, a sense of hitting at the front edge of the seat cushion during pedal operation or the like is reduced, a sense of stroke during seating is enhanced, and since a load is not easily applied directly to the front edge of the seat cushion, the torsion bar acts sensitivity and a feeling of bottom touch is not easily caused. Therefore, a feeling of sitting on, and seating comfort are improved. In this case, it is preferable for the front torsion bar unit to provide the torsion bar acting as a fulcrum so as to place lower than the supporting frame supported via the arms. Also, it is preferable that the solid knitted fabric or the like composing a base net is passed through above the supporting frame of the front torsion bar unit and is engaged with the engaging bracket provided so as to protrude downward from the supporting frame. By structuring as above, when a load (body weight) is applied, since the base net displaces so as to wind around the supporting frame, the component of the load in the horizontal direction easily works, and when the load is fluctuated, the tendency of the torsion bar and arms (supporting frame) of the front torsion bar unit to displace is greater than the tendency of the base net to expand. This comes from that the spring constant of the base net tension is greater than that of the torsion bar. On the other hand, in a conventionally adopted structure in which a torsion bar unit is disposed in the rear of the seat cushion, since the point of load while stably seated is under the ischium node, in other words, close to the torsion bar unit disposed in the rear, component force in the gravitational direction acts on the torsion bar, which makes the torsion bar not easily move, and the component force in the horizontal direction to let the supporting frame move in front and behind not easily act.

Furthermore, since tension works rearward from the supporting frame of the front torsion bar unit as a start point, the facial rigidity of the base net is increased, a surface having high facial rigidity is formed around the supporting frame. Accordingly, the leg positioned in the front of the seat cushion around the supporting frame recognizes this portion as a face, a sense of local hitting is suppressed.

As above, a structure to dispose in the front a torsion bar unit having arms and a supporting frame pivotally supported by a torsion bar in front and behind, as in the present invention, works with greater sensitivity, even upon tiny load fluctuations, compared with the conventional art. Absorbency of high frequency vibration is further enhanced, and urethane material (pad material) used to suppress a feeling of something foreign in the front of the seat cushion can be unnecessary, or can be thinner when necessary.

When stretching a base net, disposing only one pipe-like or plate-like frame in the rear of the seat cushion is sufficient, then it becomes possible to ensure a large space for the leg room available for a person seated on the rear seat by enlarging a lower space behind the front seat.

Since the torsion bar unit is provided at the front end of the base net, when the seat structure of the present invention is used for a vehicle seat for a car or the like, when the buttocks are shifted forward on collision, it has functions to press the body against the cushioning member for the seat back, restraining poping out of a human body forward by the supporting frame of the torsion bar unit, and owing to high facial rigidity, it can make sinking-in of the body (occupant) small, so that the safety on collision can be enhanced. Furthermore, when a large rearward load is applied to the seat back, the vicinity at the rear of the side frame for the seat cushion elastically deforms downward, the rear frame with which the rear end of the base net displaces rearward, so that tension is given to the base net in the direction of stretching, and thus a function to suppress deformation of frames in the seat back is also included.

What is claimed is:

1. A seat structure having
   a seat frame comprising a rear frame and side frames,
   a seat back,
   a seat cushion comprising a cushioning member,
   a base net comprising a front end and a rear end and positioned under the cushioning member for the seat cushion, a front torsion bar unit comprising a torsion bar arms connecting to the torsion bar at each of its ends, and a supporting frame,
   wherein the arms pivot forward and rearward around the torsion bar acting as a fulcrum,
   and wherein the base net is stretched across the seat frame from the supporting frame of the front torsion bar unit to the rear frame of the seat frame.

2. The seat structure according to claim 1, wherein the torsion bar is positioned lower than the supporting frame.

3. The seat structure according to claim 2, wherein an engaging bracket supporting frame comprises an engaging bracket protruding downward, so that the front end of the base net is wound around the supporting frame from above via the engaging bracket.

4. The seat structure according to claim 1, wherein the pivoting range of the arms have a pivoting range of 40° or less at an unloaded state.

5. The seat structure according to claim 1, wherein the side frames of the seat frame are elastically deformed when a load equal to or greater than a predetermined limit is placed rearwards on the seat back during impact.

6. The seat structure according to claim 1, further comprising an auxiliary elastic mechanism positioned under the base net between the front torsion bar unit and the rear frame of the seat frame.

7. The seat structure according to claim 6, wherein the auxiliary elastic mechanism comprises an air cushion having a plurality of partitioned bulging portions under the base net.

8. The seat structure according to claim 6, wherein said auxiliary elastic mechanism comprises an auxiliary net positioned under the base net, and a coil spring elastically supporting the auxiliary net to the side frames of the seat frame.

9. The seat structure according to claims 1, further comprising an elastic force adjusting spring positioned between front end of the base net and the front end of the cushion.

10. The seat structure according to claim 1, further comprising an elastic force adjusting spring positioned between the rear end of the base net and the rear end of the seat cushion.

* * * * *